(12) United States Patent  (10) Patent No.: US 9,040,145 B2
Lyons et al.  (45) Date of Patent: May 26, 2015

(54) POLYMER HAVING SUPERHYDROPHOBIC SURFACE

(71) Applicant: Research Foundation of the City University of New York, New York, NY (US)

(72) Inventors: Alan Michael Lyons, New Providence, NJ (US); QianFeng Xu, Staten Island, NY (US)

(73) Assignee: Research Foundation of the City University of New York, New York, NY (US)

( * ) Notice: Subject to any disclaimer, the term of this patent is extended or adjusted under 35 U.S.C. 154(b) by 24 days.

(21) Appl. No.: 13/796,908

(22) Filed: Mar. 12, 2013

(65) Prior Publication Data

US 2013/0251948 A1  Sep. 26, 2013

Related U.S. Application Data

(63) Continuation-in-part of application No. PCT/US2012/026942, filed on Feb. 28, 2012.

(60) Provisional application No. 61/609,634, filed on Mar. 12, 2012, provisional application No. 61/555,888, filed on Nov. 4, 2011, provisional application No. 61/447,515, filed on Feb. 28, 2011, provisional application No. 61/447,508, filed on Feb. 28, 2011.

(51) Int. Cl.
*B32B 5/16* (2006.01)
*B32B 3/30* (2006.01)
(Continued)

(52) U.S. Cl.
CPC ... *B32B 5/16* (2013.01); *B32B 3/30* (2013.01); *B32B 27/04* (2013.01); *Y10T 428/24372* (2015.01); *Y10T 428/24421* (2015.01);
(Continued)

(58) Field of Classification Search
CPC ...... B08B 17/065; B82Y 30/00; B32B 27/04; B32B 5/16; Y10T 428/24421; Y10T 428/24413; Y10T 428/24372
USPC .................................................. 428/143, 141
See application file for complete search history.

(56) References Cited

U.S. PATENT DOCUMENTS

2007/0013106 A1  1/2007  Lee et al.
2007/0298216 A1*  12/2007  Jing et al. ...................... 428/141
(Continued)

FOREIGN PATENT DOCUMENTS

KR  100749082 B1  8/2007

OTHER PUBLICATIONS

KIPO (ISA/KR), International Search Report (ISR) from corresponding PCT/priority application No. PCT/US2012/026942 as completed Sep. 27, 2012 (total 3 pages).
(Continued)

*Primary Examiner* — Aaron Austin
*Assistant Examiner* — Jasper Saberi
(74) *Attorney, Agent, or Firm* — Schmeiser, Olsen & Watts, LLP; Peter J. Mikesell

(57) ABSTRACT

The disclosure relates to a superhydrophobic surface. Methods of fabrication are disclosed including laminating a polymer sheet having a surface to a template having a textured surface or a layer of a nanomaterial (e.g., nanoparticles or nanofibers) to convert the surface of the polymer sheet to a hydrophobic surface having a water contact angle of at least about 150°.

20 Claims, 27 Drawing Sheets

(51) Int. Cl.
  *B32B 27/04* (2006.01)
  *B08B 17/06* (2006.01)
  *B82Y 30/00* (2011.01)
  *B82Y 40/00* (2011.01)
(52) U.S. Cl.
  CPC ....... *Y10T428/24413* (2015.01); *B08B 17/065* (2013.01); *B82Y 30/00* (2013.01); *B82Y 40/00* (2013.01)

(56) References Cited

U.S. PATENT DOCUMENTS

2009/0246473 A1 10/2009 Lee et al.
2009/0269560 A1* 10/2009 Dhinojwala et al. .......... 428/206
2011/0143094 A1* 6/2011 Kitada et al. .................. 428/143

OTHER PUBLICATIONS

Caputo, Gianvito et al., "Reversibly Light-Swuitchable Wettability of Hybrid Organic/Inorganic Surfaces with Dual Micro-/Nanoscale Roughness", Adv. Funct. Mater. 2009, 19, DOI: 10.1002/adfm.200800909, pp. 1149-1157.
Jin, Ren-Hua et al., "Biomimetically Controlled Formation of Nanotextured Silica/Titania Films on Arbitrary Substrates and Their Tunable Surface Function", Adv. Mater. 2009, 21, DOI: 10.1002/adma.200803393, pp. 3750-3753.
Feng, Xinjian et al., "The Fabrication and Switchable Superhydrophobicity of TiO2 Nanorod Films", Angew. Chem. Int. Ed. 2005, 44, DOI: 10.1002/anie.200501337, pp. 5115-5118.
Xu, Fabricating Superhydrophobic Polymer Surfaces with Excellent Abrasion REsistance by a Simple Lamination Templating Method; ABS Appl. Mater. Interfaces, 2011, 3, 3508-3514; Jul. 28, 2011.
Karunakaran; Highly Transparent Superhydrophobic Surfaces from the Coassembly of Nanoparticles; Langmuir 2011; 27, 4594-4602; Feb. 28, 2011.
Xu, Organic-Inorganic Composite Nanocoatings with Superhydrophobicity, Good Transparency, and Thermal Stability; acsnano.org; v 4, No. 4, 2201-2209, 2010.
Xu, Superhydrophobic and transparent coatings based on removable polymeric spheres, J. of Materials Chemistry, 19, 655-660, 2009.
Xu, Transparent, Superhydrophobic Surfaces from One-Step Spin Coating of Hydrophobic Nanoparticles; ACS Appl. Mater. Interfaces, 4, 1118-1125, Jan. 31, 2012.
Ebert, Transparent, Superhydrophobic, and Wear-REsistant Coatings on Glass and Polymer Substrates Using SiO2, ZnO and ITO nanoparticles; Langmuir, 28, 11391-11399; Jul. 5, 2012.
Quere; Wetting and Roughness, Annu. Rev. Mater. Res. 2008:38:71-99; Jul. 9, 2008.
Lim, Ho Sun et al., UV-Driven Reversible Switching of a Roselike Vanadium Oxide Film between Superhydrophobicity and Superhydrophilicity, J. Am. Chem. Soc., 129, 2007, 4128-4129.
Zhang et al., Preparation and Photocatalytic WEttability Conversion of TiOx-Based Superhydrophobic Surfaces, American Chemical Society, 10.1021/1a0618869; Oct. 13, 2006.
Blossey, Ralf, Self-cleaning surfaces—virtual realities, Nature Publishing Group, Nature Materials, vol. 2, May 2003 available at www.nature.com/naturematerials.

* cited by examiner

POLYMER HAVING SUPERHYDROPHOBIC SURFACE

CROSS-REFERENCE TO RELATED APPLICATIONS

This application claims priority to and the benefit of U.S. provisional patent application Ser. No. 61/609,634 (filed Mar. 12, 2012), and is a continuation-in-part of international PCT patent application Serial No. PCT/US2012/026942 (filed Feb. 28, 2012) which claims priority to U.S. provisional patent applications 61/555,888 (filed Nov. 4, 2011); 61/447,515 (filed Feb. 28, 2011) and 61/447,508 (filed Feb. 28, 2011). The content of each of these applications is incorporated herein by reference in its entirety.

STATEMENT REGARDING FEDERALLY FUNDED RESEARCH OR DEVELOPMENT

This invention was made with government support under contract number 1215288 awarded by the National Science Foundation (NSF). The government has certain rights in the invention.

FIELD OF THE INVENTION

This disclosure relates to polymers have a superhydrophobic surface as well as related methods and articles.

BACKGROUND

Superhydrophobic surfaces having a water contact angle greater than 150° and a water slip-off angle less than 10° can have many potential applications, such as from small non-wetting micro/nanoelectronics to large self-cleaning industrial equipment.

Numerous methods and materials have been developed to fabricate superhydrophobic surfaces. For practical applications, such surfaces should exhibit mechanical and chemical stability as well as abrasion resistance. For example, if a superhydrophobic surface is touched by a bare hand, the touched area of the surface could be contaminated by salt and oil and therefore could have an increased surface energy, which reduces the surface hydrophobicity. In addition, the force exerted by touching could damage the fragile rough structure of the surface, which could result in permanent loss of its superhydrophobicity. However, despite ongoing efforts, most reported artificial superhydrophobic surfaces suffer from poor mechanical and/or chemical stability.

In addition to mechanical and/or chemical stability, a commercially viable superhydrophobic surface should exhibit a reliable resistance to water pressure. In practice, a static pressure could be generated by immersing a hydrophobic surface under water and a dynamic pressure could be generated by applying water droplets or water streams onto a hydrophobic surface. Recent research shows that even a lotus leaf can be wetted within one hour after immersed under water at a depth of 0.55 m (i.e., under a water pressure of about 0.78 psi).

SUMMARY OF THE INVENTION

This disclosure includes the unexpected discovery that a polymer having a superhydrophobic surface (e.g., having a water contact angle of at least about 150°) can be prepared in a facile method by laminating the polymer sheet with a template (e.g., a mesh) or a layer of a nanomaterial (e.g., nanoparticles or nanofibers). The superhydrophobic surface thus formed has excellent mechanical properties, chemical resistance, abrasion resistance, and/or static and dynamic water pressure resistance. The method is a simple, low-cost process that is compatible with large scale manufacturing.

In one embodiment, an article is disclosed that comprises a polymer with a hydrophobic surface with a water contact angle of at least about 150°. The article includes a plurality of nanoparticles disposed on the hydrophobic surface, at least some of which are partially embedded in the polymer and partially exposed on the hydrophobic surface.

In another embodiment, an article is disclosed that comprises a polymer with a hydrophobic surface with a plurality of protrusions. Each protrusion comprises a top surface and a side wall. A plurality of nanoparticles are disposed on the hydrophobic surface, at least some of which are partially embedded in the polymer and partially exposed on the hydrophobic surface. The plurality of protrusions comprises two neighboring protrusions separated by a groove with a distance of at least about 5 micrometers and less than about 500 micrometers.

In another embodiment, a method for forming a hydrophobic polymer is disclosed. The method comprising the step of laminating a polymer sheet having a surface to a template having a textured surface. The surface of the polymer faces the textured surface of the template. The template comprises a mesh, a fabric or porous membrane or a sandpaper. The method further comprises the step of separating the polymer sheet and the template, thereby converting the surface of the polymer sheet to a hydrophobic surface having a water contact angle of at least about 150°.

BRIEF DESCRIPTION OF THE DRAWINGS

The present invention is disclosed with reference to the accompanying drawings, wherein:

FIG. 23 depicts contact angle being altered under certain conditions while

FIG. 26 is a depiction of a water contact angle on an exemplary surface while

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
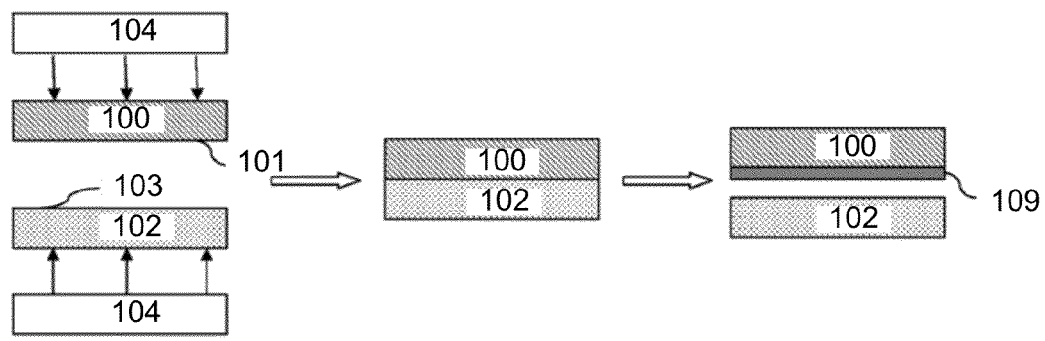
FIG. 1 is an illustration showing an exemplary method of using plate lamination for preparing a polymer sheet having a superhydrophobic surface by laminating the polymer sheet with a template.

This disclosure generally relates to polymers having a superhydrophobic surface (e.g., having a water contact angle of at least about 150°), as well as methods of preparing such polymers.

In general, the methods disclosed herein include laminating a polymer sheet having a surface to a template having a textured surface or a layer of a nanomaterial (e.g., nanoparticles or nanofibers) to convert the surface of the polymer sheet to a hydrophobic surface having a water contact angle of at least about 150°.

The polymer sheet described herein can include either a thermoplastic polymer or a thermoset polymer (or its precursors). In some embodiments, the polymer sheet described herein preferably includes a thermoplastic polymer. Exemplary of suitable polymers that can be used in the polymer sheet include polyolefins (e.g., polyethylenes or polypropylenes), polyacrylates (e.g., poly(methyl methacrylate)s), poly(vinyl chloride)s, polystyrenes, poly(tetrafluoroethylene)s, polysiloxanes, polycarbonates, or epoxy polymers. Examples of suitable polyethylenes include low density polyethylenes, high density polyethylenes, linear low density polyethylenes, and ultra-high molecular weight polyethylenes. In some embodiments, the polymer sheet described herein can be made of two or more (e.g., three, four, or five) different polymers, such as two or more different polymers described above. In some embodiments, a liquid polymer (e.g., a polysiloxane) can be combined with at least one inorganic material (e.g., inorganic particles, inorganic microparticles, inorganic nanoparticles, particle agglomerates, inorganic fibers (e.g., glass fibers), or inorganic nanofibers) to form a paste, which can be used in the methods described herein to form a polymer sheet having a superhydrophobic surface.

In some embodiments, the polymer used in the polymer sheet described herein does not include a hydrophilic group (e.g., OH, COOH, or $NH_2$). In such embodiments, the polymer used in the polymer sheet described herein is not a hydrophilic polymer or a water-soluble polymer.

In some embodiments, the polymer sheet described herein can be made from a polymer composite material. For example, the polymer sheet can further include at least one inorganic material (e.g., inorganic particles, inorganic microparticles, inorganic nanoparticles, particle agglomerates, inorganic fibers (e.g., glass fibers), or inorganic nanofibers). As used herein, the term "microparticles" generally refers to particles having an average diameter ranging from about 1 micrometers to about 1000 micrometers. As used herein, the term "nanoparticles" generally refers to particles having an average diameter ranging from about 1 nm to about 1000 nm. Examples of suitable inorganic material include $SiO_2$ particles (e.g., $SiO_2$ nanoparticles), $TiO_2$ particles (e.g., $TiO_2$ nanoparticles), $Al_2O_3$ particles (e.g., $Al_2O_3$ nanoparticles), and/or carbon particles (e.g., carbon nanoparticles) or fibers (e.g., carbon nanofibers).

In some embodiments, the polymer sheet described herein has a thickness of at least about 25 micrometers (e.g., at least about 50 micrometers, at least about 100 micrometers, at least about 150 micrometers, at least about 200 micrometers, at least about 250 micrometers, at least about 300 micrometers, at least about 350 micrometers, or at least about 400 micrometers) and/or at most about 1 cm (e.g., at most about 7.5 mm, at most about 5 mm, at most about 2.5 mm, at most about 1 mm, at most about 750 micrometers, at most about 700 micrometers, at most about 650 micrometers, or at most about 600 micrometers). For example, the polymer sheet can have a thickness ranging from about 200 micrometers to about 600 micrometers.

In some embodiments, the polymers comprise surfaces with multi-level hierarchical structures. These multi-level hierarchical structures include fine structure (e.g. nanoparticles with sizes from 1 to 100 nm), medium structures (e.g. agglomerates of multiple nanoparticles with sizes from 100-300 nm), and large structures (e.g. micro-roughness of multiple agglomerates with sizes of 300 nm to 3 microns). In one embodiment, the agglomerates range in size from 20 to 200 nm. As described in further detail elsewhere in this specification, a layer of nanoparticles is disposed on a polymer. Predetermined lamination conditions are then applied to selectively percolate the polymer through gaps/pores between nanoparticles in the nanoparticle layer. The polymer filaments that extend through these pores partially embeds the nanoparticles in the polymer while leaving at least some of the nanoparticles partially exposed. By carefully controlling the lamination conditions (e.g. temperature, pressure, time, etc) partially embedded nanoparticles can be formed and the length of the polymer filaments can be controlled. In one embodiment, the polymer filaments range in length from about 1 microns to about 100 microns.

FIG. 1 is an illustration showing an exemplary method of using plate lamination for preparing a polymer sheet having a superhydrophobic surface by laminating the polymer sheet with a template. As shown in FIG. 1, a polymer sheet having a superhydrophobic surface can be prepared by first disposing a polymer sheet 100 having a surface 101 and a template 102 having a textured surface 103 between two plates 104 such that surface 101 faces textured surface 103. For example, one can first mount polymer sheet 100 on template 102 as shown in FIG. 1, and then place the article thus formed between two plates 104 so that polymer sheet 100 is in contact with one of plates 104 and template 102 is in contact with the other of plates 104.

In general, template 102 having a textured surface 103 can be a mesh, a fabric (e.g., a porous fabric), or a porous membrane, or a sandpaper. Template 102 can generally be made from any suitable material, such as a polymer (e.g., a nylon), a fabric, or a metal (e.g., stainless steel). For example, template 102 can be a metal woven mesh. In general, plates 104 can also be made from any suitable material, such as a metal (e.g., stainless steel).

In some embodiments, template 102 can be porous to allow the polymer in polymer sheet 100 to penetrate the pores to form a continuous polymer layer at the back side of template 102 and to minimize air trapped in between polymer sheet 100 and template 102. In some embodiments, template 102 (e.g., a mesh) can have an average pore size (e.g., pore diameter, pore length, or pore width) of at least about 2 micrometers (e.g., at least about 5 micrometers, at least about 10 micrometers, at least 25 micrometers, at least about 50 micrometers, or at least about 100 micrometers) to at most about 800 micrometers (e.g., at most about 600 micrometers, at most about 400 micrometers, at most about 200 micrometers, or at most about 100 micrometers). For example, template 102 can be a nylon mesh having a pore diameter of about 40 micrometers and a wire width of about 40 micrometers.

In some embodiments, when template 102 is a mesh, template 102 can have an average depth of pores of at least about 2 micrometers (e.g., at least about 5 micrometers, at least about 10 micrometers, at least 25 micrometers, at least about 50 micrometers, or at least about 100 micrometers) to at most about 800 micrometers (e.g., at most about 600 micrometers, at most about 400 micrometers, at most about 200 micrometers, or at most about 100 micrometers).

In the above embodiments, template 102 can be fully porous such that the polymer in polymer sheet 100 can infiltrate template 102 without trapping air. Without wishing to be bound by theory, it is believed that if air is trapped in template 102 (e.g., in a template made by etching holes into a silicon or metal substrate), the gas pressure would prevent the polymer from fully infiltrating into the template pattern and replicating its structure. This would create a region without the appropriate roughness and thus not fully superhydrophobic. In some embodiments, a template that has rough features but is not fully porous could be used. For example, during roll lamination, a fully porous template may not be necessary since the contact region under pressure between the polymer and template can be narrow (about 3 mm wide), which would reduce the incidence of gas being trapped. In other embodiments, the lamination process can be conducted under vacuum and there is no gas present during lamination. In such embodiments, templates with blind holes could be used without the risk of trapped gas causing surface defects.

After polymer sheet 100 and template 102 are placed between plates 104, polymer sheet 100 and template 102 can be laminated together by applying a certain pressure to plates 104 at an elevated temperature for a certain period of time.

In general, the pressure, temperature, and time required during the lamination process are sufficient to reduce the viscosity of the polymer in polymer sheet 100 such that the polymer can penetrate the pores of template 102. In some embodiments, template 102 is completely embedded in polymer sheet 100 during the lamination step such that the polymer in polymer sheet 100 forms a continuous polymer layer on the back side of template 102. In some embodiments, when the polymer in polymer sheet 100 is semicrystalline or crystalline, the lamination temperature is higher than (e.g., at least about 1° C. higher than, at least about 3° C. higher than, at least about 5° C. higher than, at least about 10° C. higher than, or at least about 50° C. higher than) the melting temperature of the polymer. For example, when polymer sheet 100 is made from a LDPE having a melting point of 110° C., the lamination temperature can be about 113° C. In some embodiments, when the polymer in polymer sheet 100 is noncrystalline or amorphous, the lamination temperature is higher than (e.g., at least about 1° C. higher than, at least about 3° C. higher than, at least about 5° C. higher than, at least about 10° C. higher than, or at least about 50° C. higher than) the glass transition temperature of the polymer. In some embodiments, when the polymer in polymer sheet 100 is a thermoset polymer or its precursor, the lamination temperature is higher than (e.g., at least about 1° C. higher than, at least about 3° C. higher than, at least about 5° C. higher than, at least about 10° C. higher than, or at least about 50° C. higher than) softening temperature of the polymer. In some embodiments, the lamination temperature can be at least about 100° C. (e.g., at least about 120° C., at least about 140° C., or at least about 160° C.) and/or at most about 250° C. (e.g., at most about 220° C., at most about 200° C., or at most about 180° C.). Without wishing to be bound by theory, it is believed that, if the lamination temperature is too low (e.g., lower than the melting temperature of the polymer), the polymer in polymer sheet 100 may not flow through the pores of template 102 to form a continuous layer on the back side of template and therefore the polymer may not be stretched and torn when template 102 is peeled off polymer sheet 100. As a result, the aspect ratio of the embossed features may not be sufficient to create roughness adequate to allow surface 101 to exhibit superhydrophobicity.

In some embodiments, the lamination pressure can be at least about 0.5 psi (e.g., at least about 1 psi, at least about 5 psi, at least about 10 psi, at least about 20 psi, at least about 30 psi, at least about 50 psi, at least about 100 psi, or at least about 200 psi) and/or at most about 10000 psi (e.g., at most about 8000 psi, at most about 7000 psi, at most about 6000 psi, at most about 5000 psi, at most about 2500 psi, or at most about 1000 psi).

In some embodiments, the lamination time is at least about 0.1 second (e.g., at least about 0.5 second, at least about 1 second, at least about 30 seconds, or at least about 1 minute) and/or at most about 2 hours (e.g., at most about 1.5 hours, at most about 1 hour, at most about 45 minutes, at most about 30 minutes, at most about 15 minutes, at most about 10 minutes, or at most about 5 minutes).

After the lamination process, the laminated material (i.e., polymer sheet 100 laminated with template 102) can generally be cooled down to a suitable temperature (e.g., room temperature such as 25° C.) in air. In some embodiments, when the polymer in polymer sheet 100 is semicrystalline or crystalline, the laminated material can be cooled below the melting temperature of the polymer before separating polymer sheet 100 and template 102. In some embodiments, polymer sheet 100 and template 102 can be separated at a temperature above the glass transition temperature or softening temperature of the polymer in polymer sheet 100 as it can be difficult to separate them below its glass transition or softening temperature when polymer sheet 100 hardens. Without wishing to be bound by theory, it is believed that plates 104 can be easily removed as no chemical bonds are formed between polymer sheet 100 and plate 104 or between template 102 and plate 104.

In general, after template 102 is separated from polymer sheet 100 (e.g., by peeling template 102 from polymer sheet 100), surface 101 on polymer sheet 100 is converted into a superhydrophobic surface 109 (e.g., having a water contact angle of at least about 150°). Without wishing to be bound by theory, it is believed that, because the polymer in polymer sheet 100 penetrates the pores in template 102 during the lamination process, template 102 is at least partially embedded by the polymer at surface 101 of polymer sheet 100. As a result, peeling off template 102 from polymer sheet 100 gives surface 101 a sufficient roughness, thereby converting surface 101 into a superhydrophobic surface 109. Further, without wishing to be bound by theory, it is believed that the roughness on surface 109 can be caused by the pores in template 102 (i.e., as the polymer in polymer sheet 100 penetrates the pores during lamination) and/or the roughness of the material (e.g., the wires, filaments, or fabrics) that forms template 102.

In some embodiments, template 102 can be coated with a layer of inorganic nanoparticles before template 102 is laminated with polymer sheet 100. Template 102 thus formed can then be used to form a superhydrophobic surface on polymer sheet 100 by using the same method shown in FIG. 1.

Examples of suitable inorganic nanoparticles that can be coated onto template 102 include $SiO_2$ nanoparticles, $TiO_2$ nanoparticles, $Al_2O_3$ nanoparticles, and carbon nanoparticles. In some embodiments, the inorganic nanoparticles can have an average diameter of at least about 3 nm (e.g., at least about 5 nm, at least about 10 nm, at least about 30 nm, at least about 50 nm, at least about 100 nm, or at least about 150 nm) and/or at most about 1000 nm (e.g., at most about 800 nm, at most about 600 nm, at most about 400 nm, or at most about 300 nm).

In some embodiments, the inorganic nanoparticles can be surface treated (e.g., by reacting the nanoparticles with a suitable agent such as silane) to reduce their hydrophilicity. An example of such inorganic nanoparticles is silane-treated $SiO_2$ nanoparticles.

In some embodiments, the inorganic nanoparticles can be coated onto template 102 by a method known in the art. For example, the coating can be carried out by dispersing the inorganic nanoparticles in an aqueous solvent (e.g., water or a mixture of water and an alcohol such as methanol) to form a dispersion, applying the dispersion onto template 102, and drying the dispersion. As another example, the inorganic nanoparticles can be disposed directly on template 102 in a solid form (e.g., as a powder).

Without wishing to be bound by theory, it is believed that the inorganic nanoparticles on template 102 can generate nanostructures on surface 101 of polymer sheet 100, thereby adding additional roughness on surface 101 and facilitating formation of a superhydrophobic surface. In addition, without wishing to be bound by theory, it is believed that surface 101 treated with template 102 coated with a layer of inorganic nanoparticles can have improved superhydrophobic properties (e.g., an increased water contact angle or an decreased water slip-off angle), improved abrasion resistance, and improved water pressure resistance.

In some embodiments, the lamination pressure described above depends on whether template 102 or polymer sheet 100 is coated with a layer of nanoparticles. When template 102 or polymer sheet 100 is coated with a layer of nanoparticles, without wishing to be bound by theory, it is believed that, if the lamination pressure is too high (e.g., more than 10,000 psi), the extent of polymer infiltration into the porous nanoparticle layer could be significantly increased and can force the nanoparticles to be fully embedded into the polymer sheet, thereby reducing the roughness (e.g., the micro-texture at a scale of about 100 microns) generated by the nanoparticles on the surface of the polymer sheet, which reduces the hydrophobicity of the surface.

Further, in such embodiments, without wishing to be bound by theory, it is believed that, if the lamination pressure is too low (e.g., lower than 0.5 psi), the nanoparticles are not embedded into the polymer sheet, thereby reducing the roughness generated by the nanoparticles on the surface of the polymer sheet.

In general, a polymer sheet having a superhydrophobic surface (e.g., having a water contact angle of at least about 150°) can also be prepared by laminating the polymer sheet with a layer of a nanomaterial (e.g., nanoparticles or nanofibers). In such embodiments, the lamination process can be performed by plate lamination, autoclave lamination, or roll lamination.

Figure 2:
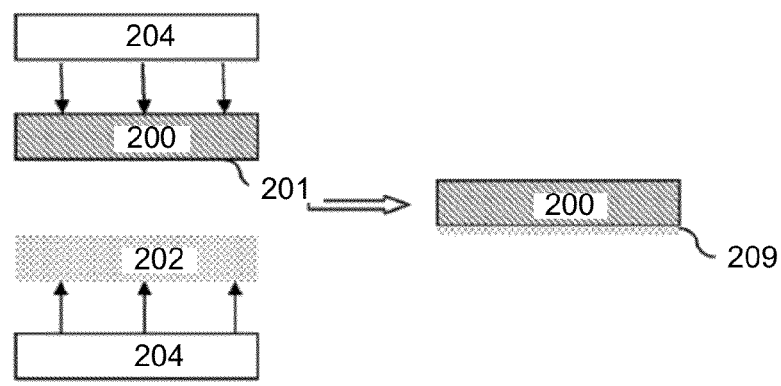
FIG. 2 is an illustration showing an exemplary method of using plate lamination for preparing a polymer sheet having a superhydrophobic surface by laminating the polymer sheet with a layer of a nanomaterial (e.g., nanoparticles or nanofibers)

FIG. 2 is an illustration showing an exemplary method of using plate lamination for preparing a polymer sheet having a superhydrophobic surface by laminating the polymer sheet with a layer of a nanomaterial. As shown in FIG. 2, a polymer sheet having a superhydrophobic surface can be prepared by first disposing a polymer sheet 200 having a surface 201 and a layer 202 containing a nanomaterial (e.g., nanoparticles or nanofibers) between two plates 204. For example, one can apply layer 202 onto one of plates 204, and then sequentially place polymer sheet 200 and the other of plates 204 on top of layer 202 so that polymer sheet 200 is in contact with layer 202 and one of plates 204.

In some embodiments, polymer sheet 200 and plates 204 can be the same as those described above in FIG. 1. In some embodiments, when layer 20 includes inorganic nanoparticles (e.g., $SiO_2$ nanoparticles or $TiO_2$ nanoparticles), the inorganic nanoparticles can be the same as those described in connection with the methods shown in FIG. 1 above.

Layer 202 can generally be disposed on one of plates 204 by a known method. For example, layer 202 can be disposed on one of plates 204 by dispersing a nanomaterial (e.g., nanoparticles or nanofibers) in an aqueous solvent (e.g., water or a mixture of water and an alcohol such as methanol) to form a dispersion, disposing the dispersion onto one of plates 204, and then drying the dispersion. As another example, layer 202 can be disposed on one of plates 204 by directly applying a nanomaterial in a solid form (e.g., as a powder) onto plate 204. In such embodiments, plate 204 can be covered by a substrate having a textured surface (e.g., a piece of paper or a rigid substrate having a textured surface) onto which the solid nanomaterial can be applied. In general, layer 202 thus formed is porous such that the polymer in polymer sheet 200 can penetrate the pores in layer 202 during the lamination process. Without wishing to be bound by theory, it is believed that using a substrate having a textured surface to cover plate 204 can facilitate retaining the nanomaterial on plate 204 and/or can impart a large scale of surface roughness to surface 201 on polymer sheet 200, which can improve the superhydrophobic properties after a superhydrophobic surface is formed. In some embodiments, layer 202 can be disposed (e.g., by a solution coating or coating in a solid form) on polymer sheet 200. The coated polymer sheet can then be disposed between two plates 204 before lamination.

In general, layer 202 can have any suitable thickness. In some embodiments, layer 202 can have a thickness of at least about 1 micrometers (e.g., at least about 5 micrometers, at least about 10 micrometers, at least about 20 micrometers, or at least about 40 micrometers) and/or at most about 5 nm (e.g., at most about 3 mm, at most about 1 mm, at most about 500 micrometers, at most about 100 micrometers, at most about 70 micrometers, at most about 60 micrometers, or at most about 50 micrometers).

After polymer sheet 200 and layer 202 are placed between plates 204, polymer sheet 200 and layer 202 can be laminated together by applying a certain pressure to plates 204 at an elevated temperature for a certain period of time. In general, the pressure, temperature, and time required during the lamination process are sufficient to allow the polymer in polymer sheet 200 to penetrate into the pores of the nanomaterial (e.g., nanoparticles) such that at least some of the nanomaterial is partially embedded in polymer sheet 200 and partially exposed to air on surface 201. In some embodiments, the lamination temperature is higher than (e.g., at least about 1° C. higher than, at least about 3° C. higher than, at least about 5° C. higher than, at least about 10° C. higher than) the melting temperature (or the glass transition or softening temperature) of the polymer in polymer sheet 200. For example, when polymer sheet 200 is made from a LDPE having a melting point of 119° C., the lamination temperature can be from about 120° C. to about 130° C. In some embodiments, the lamination temperature can be at least about 100° C. (e.g., at least about 120° C., at least about 140° C., or at least about 160° C.) and/or at most about 250° C. (e.g., at most about 220° C., at most about 200° C., or at most about 180° C.). In some embodiments, the lamination time and pressure can be the same as those described in connection with the methods shown in FIG. 1 above.

After the lamination process, the laminated material (i.e., polymer sheet 200 laminated with layer 202) can generally be cooled down to a suitable temperature in air. For example, the laminated material can be cooled down to a temperature below the melting temperature but above the glass transition temperature of the polymer in polymer sheet 200. Plates 24 can subsequently be removed to form polymer sheet having a superhydrophobic surface 209. Without wishing to be bound by theory, it is believed that plates 204 can be easily removed as no chemical bonds are formed between polymer sheet 200 and plate 204 or between layer 202 and plate 204. In addition, without wishing to be bound by theory, it is believed that, as layer 202 does not include a template and the nanomaterial in layer 202 is embedded in (i.e., partially or fully) polymer sheet 200, no addition step (e.g., peeling off a template as shown in FIG. 1) is needed to form a superhydrophobic surface on polymer sheet 200.

Figure 3A:
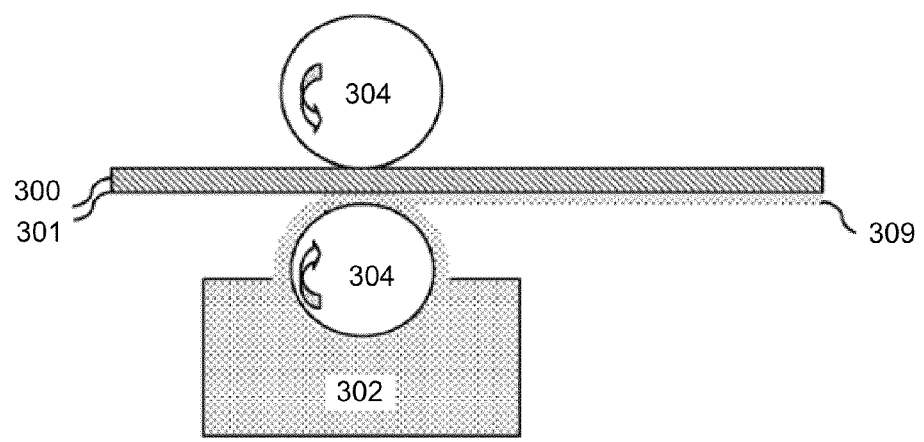
FIG. 3A is an illustration showing another exemplary method of using roll lamination for preparing a polymer sheet having a superhydrophobic surface by laminating the polymer sheet with a layer of nanoparticles or nanofibers.

In some embodiments, a polymer sheet having a superhydrophobic surface can be prepared by using roll lamination to laminate the polymer sheet together with a layer of a nanomaterial. FIG. 3A is an illustration showing an exemplary method of such an embodiment. As shown in FIG. 3A, while polymer sheet 300 having surface 301 is being fed between upper and lower rollers 304, a nanomaterial 302 (e.g., nanoparticles or nanofibers) in a container (e.g., a box) can be absorbed onto the surface of a lower roller 304 and then laminated onto polymer sheet 300 at the nip section of rollers 304. After the roll lamination is completed, surface 301 is generally converted into superhydrophobic surface 309. In some embodiments, polymer sheet 300 and nanomaterial 302 can be the same as those described with respect to FIG. 2 above.

In some embodiments, roll lamination can be carried out by feeding a carrier film (e.g., kraft paper) coated with a nanomaterial (e.g., nanoparticles or nanofibers) into two rollers at the same time as a polymer sheet such that the nanomaterial on the carrier film faces the polymer sheet. As a result, the carrier film and polymer sheet are laminated together in the nip section. After exiting the nip, the carrier film and the polymer sheet can be separated to form a polymer sheet having a superhydrophobic surface, which can be then be rolled onto a roller separately from the carrier film and stored for future use. In some embodiments, the roll lamination described above can be carried out in a roll-to-roll method.

Figure 3B:
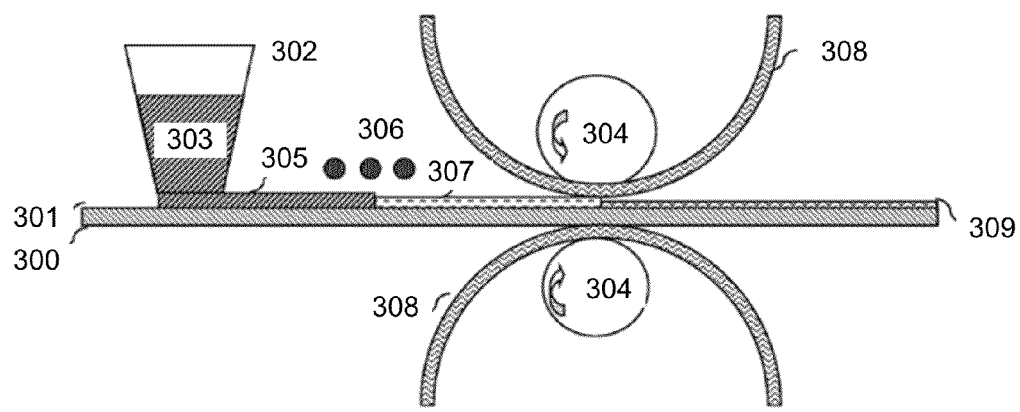
FIG. 3B is an illustration showing another exemplary method of roll lamination.

FIG. 3B is an illustration showing another exemplary roll lamination process. As shown in FIG. 3B, roll lamination can be carried out by coating a solution (e.g. with a solvent containing water or a mixture of water and an alcohol, or other suitable solvents) of nanoparticles 303 stored in coater 302 onto polymer sheet 300 to form a nanoparticle layer 305 on polymer surface 301. The solution is then passed through a drying stage 306 to remove the solvent, thereby forming layer 307 containing dried and porous nanoparticles. The coated polymer sheet 300 is then brought into a laminator having upper and lower rollers 304. Upon applying heat and pressure, the polymer in polymer sheet 300 flows into the pores between nanoparticles in layer 307 to create a superhydrophobic surface 309. In some embodiments, a release layer 308 can be placed between layer 307 and upper roller 304 to prevent the nanoparticles in layer 307 from adhering onto upper roller 304. Similarly, a second release layer 308 can be placed between polymer sheet 300 and lower roller 304 to prevent polymer 300 from adhering onto lower roller 304.

Figure 4:
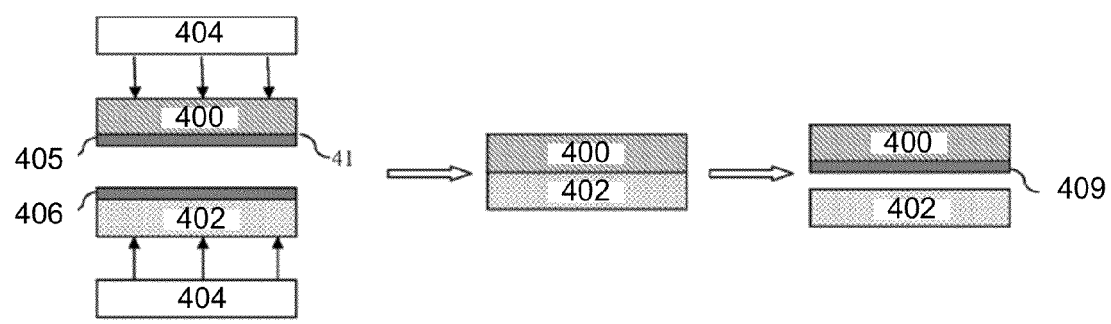
FIG. 4 is an illustration showing another exemplary method of using plate lamination for preparing a polymer sheet having a superhydrophobic surface by laminating the polymer sheet with a template coated a layer of a nanomaterial (e.g., nanoparticles or nanofibers)

In some embodiments, the nanomaterial used in the methods shown in FIG. 2 can be coated onto a template (e.g., a mesh or a fabric) before being laminated with a polymer sheet. FIG. 4 is an illustration showing an exemplary method of using plate lamination for preparing a polymer sheet having a superhydrophobic surface by laminating the polymer sheet with a template coated a layer of a nanomaterial. As shown in FIG. 4, a polymer sheet having a superhydrophobic surface can be prepared by first disposing a polymer sheet 400 having a surface 401 and a template 402 coated with a layer 406 containing a nanomaterial (e.g., nanoparticles or nano fibers) between two plates 404 such that surface 401 faces layer 406. Optionally, polymer sheet 400 can also be coated with a layer 405 containing a nanomaterial (e.g., nanoparticles or nanofibers). Polymer sheet 400 can then be laminated with layer 406 on template 402 to form a superhydrophobic surface 409 using the same approach as the methods described in connection with FIG. 1 (e.g., laminating the polymer sheet with the template, cooling the laminated material, and separating the template from the polymer sheet). In some embodiments, polymer sheet 400, template 402, and nanomaterials in layers 405 and 406 can the same as those described in connection with FIG. 1 above. In addition, in some embodiments, the lamination process (including lamination pressure, temperature, and time) can also be the same as those described in connection with FIG. 1 above.

In some embodiments, layer 405 can have a thickness of at least about 1 micrometers (e.g., at least about 5 micrometers, at least about 10 micrometers, at least about 20 micrometers, or at least about 40 micrometers) and/or at most about 800 micrometers (e.g., at most about 700 micrometers, at most about 600 micrometers, at most about 500 micrometers, at most about 300 micrometers, at most about 100 micrometers, or at most about 50 micrometers).

In some embodiments, during the lamination process, template 402 is embossed into surface 401 on polymer sheet 400 without allowing the polymer in polymer sheet 400 to penetrate the pores in template 402 and form a continuous polymer film on the back side of the template. Such an embossing process can be achieved by adjusting the lamination pressure and temperature, and can form a negative image of template 402 on surface 401, which can provide micro-sized patterns. Without wishing to be bound by theory, it is believed that such a process can create both large scale roughness (i.e., by embossing polymer sheeting 400 with template 402) and small scale roughness (i.e., by allowing the polymer in polymer sheet 400 to infiltrate into the pores in the nanoparticles on template 402 or on polymer sheet 400) on surface 401, which can improve abrasion resistance of the resulting superhydrophobic surface 409.

Without wishing to be bound by theory, it is believed that the polymer in polymer sheet 400 can flow into the pores between nanomaterials in layers 405 and 406 during the lamination process so that at least some of the nanomaterials are partially embedded and partially exposed in polymer sheet 400, thereby forming micro-sized roughness that facilitates formation of a superhydrophobic surface. In addition, micro-sized patterns on surface 401 formed by template 402 can also facilitate formation of a superhydrophobic surface. Without wishing to be bound by theory, it is believed that using a template coated with a layer of a nanomaterial can significantly improve the mechanical properties, abrasion resistance, and water pressure resistance of a superhydrophobic surface.

Without wishing to be bound by theory, it is believed that one advantage of the methods described herein is that these methods are completely free of organic solvents or toxic chemicals and therefore are environmentally friendly. Further, without wishing to be bound by theory, it is believed that another advantage of the methods described herein is that, since the template (e.g., a mesh) used in these methods is commercially available in a large format (e.g., more than 1 meter wide and/or more than hundreds of meters long), these methods can be used to manufacture superhydrophobic surfaces on a large scale. In addition, without wishing to be bound by theory, it is believed that another advantage of the methods described herein is that the template (e.g., a mesh) used in these methods can be reused and therefore can reduce production costs.

In some embodiments, the polymer sheet prepared by the methods described herein can have a hydrophobic surface that has a plurality of protrusions. In some embodiments, the protrusions can have an average length or width of at least about 2 micrometers (e.g., at least about 5 micrometers, at least about 10 micrometers, at least about 20 micrometers, or at least about 50 micrometers) and/or at most about 500 micrometers (e.g., at most about 400 micrometers, at most about 300 micrometers, at most about 200 micrometers, or at most about 100 micrometers). As used herein, the length or width of a protrusion refers to that measured substantially parallel to the surface of the polymer sheet. In some embodiments, the protrusions can have an average height of at least about 25 micrometers (e.g., at least about 50 micrometers, at least about 100 micrometers, at least about 200 micrometers, or at least about 500 micrometers) and/or at most about 1000 micrometers (e.g., at most about 900 micrometers, at most about 800 micrometers, at most about 700 micrometers, or at most about 600 micrometers). As used herein, the height of a protrusion refers to that measured substantially perpendicular to the surface of the polymer sheet. In some embodiments, the protrusions can have an average distance of at least about 5 micrometers (e.g., at least about 10 micrometers, at least about 20 micrometers, or at least about 50 micrometers) and/or at most about 500 micrometers (e.g., at most about 400 micrometers, at most about 300 micrometers, at most about 200 micrometers, or at most about 100 micrometers) between two neighboring protrusions. In some embodiments, the distance between protrusions is substantially the same across the surface. In some embodiments, the pattern of a template is replicated substantially uniformly across the surface.

In some embodiments, when a polymer sheet having a superhydrophobic surface is prepared by the methods shown in FIG. 1, the protrusions can be generated by penetration of the polymer in the polymer sheet into the pores of the template during the hot lamination process and then removal of the template. In some embodiments, when nanoparticles are used to prepare a superhydrophobic surface on a polymer sheet (e.g., as shown in FIG. 2), the protrusions can be formed from the nanoparticles partially embedded in the polymer sheet.

In some embodiments, when both a template and nanoparticles are used to prepare a superhydrophobic surface on a polymer sheet (e.g., as shown in FIG. 4), the protrusions can be formed from both the polymer in the polymer sheet and the nanoparticles partially embedded in the polymer sheet.

Figure 5:
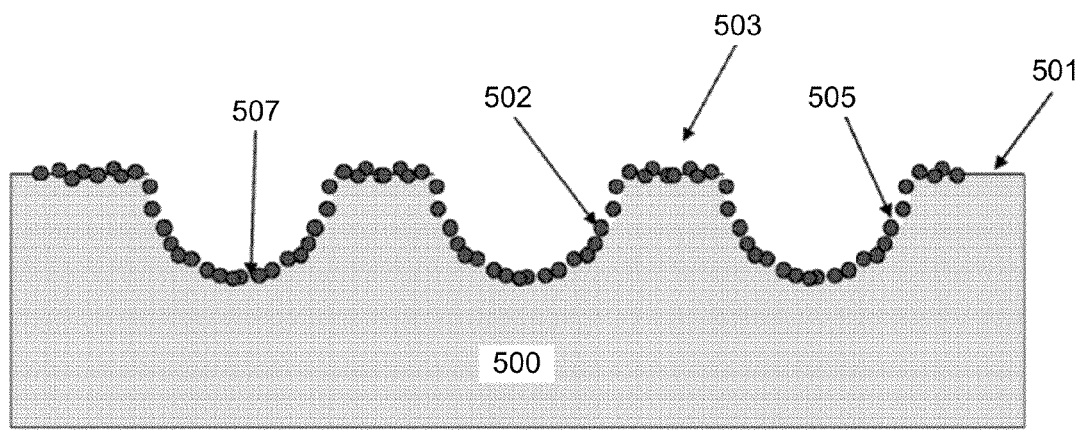
FIG. 5 is an illustration of an exemplary polymer sheet having a superhydrophobic surface.

FIG. 5 illustrates an exemplary polymer sheet prepared by the methods shown in FIG. 4 when template 402 is coated with a layer of nanoparticles. As shown in FIG. 5, polymer sheet 500 has a superhydrophobic surface 501 and includes a layer of nanoparticles 502. At least some of the nanoparticles 502 are partially embedded in polymer sheet 500 and are partially exposed to air on surface 501. Surface 501 has a plurality of protrusions, each of which has a top surface 503 and a side wall 505. In addition, polymer sheet has a surface 507 between two neighboring protrusions. Nanoparticles 502 are disposed on top surface 503, side wall 505, and surface 507 between two neighboring protrusions. In some embodiments, surface 507 between two neighboring protrusions and top surface 503 of each protrusion have an average distance of at least about 2 micrometers (e.g., at least about 5 micrometers, at least about 10 micrometers, at least about 20 micrometers, at least about 30 micrometers, at least about 50 micrometers, at least about 75 micrometers, or at least about 100 micrometers) and/or at most about 800 micrometers (e.g., at most about 700 micrometers, at most about 600 micrometers, at most about 500 micrometers, at most about 450 micrometers, at most about 400 micrometers, at most about 350 micrometers, or at most about 300 micrometers). Without wishing to be bound by theory, it is believed that, if surface 501 is scratched, although nanoparticles 502 on top surface 503 may be removed by scratching, nanoparticles 502 on side wall 505 and surface 507 can remain on surface 501. Thus, nanoparticles 502 partially embedded on surfaces 505 and 507 can significantly improve the abrasion resistance and water pressure resistance of surface 501.

Figure 6:
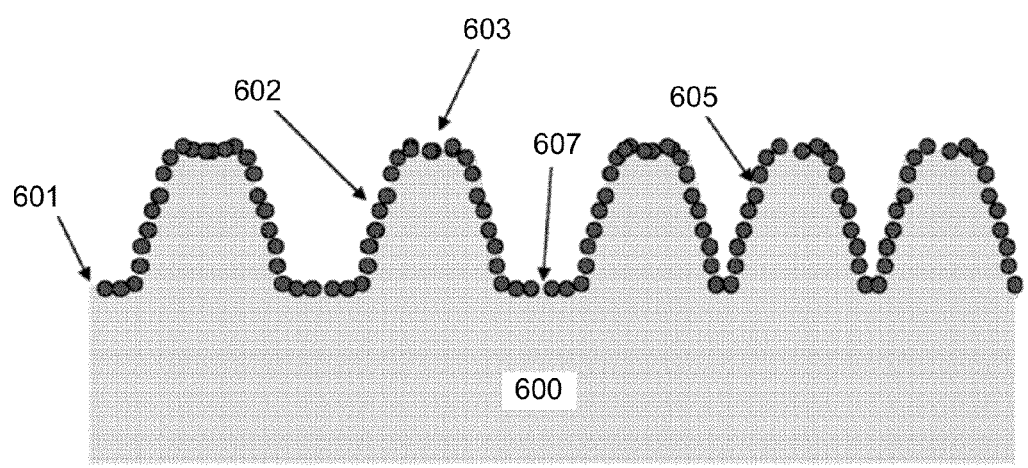
FIG. 6 is an illustration of another exemplary polymer sheet having a superhydrophobic surface.

FIG. 6 illustrates another exemplary polymer sheet prepared by the methods shown in FIG. 4 when template 402 is coated with a layer of nanoparticles. As shown in FIG. 6, polymer sheet 600 has a superhydrophobic surface 601 and includes a layer of nanoparticles 602. At least some of the nanoparticles 602 are partially embedded in polymer sheet 600 and are partially exposed to air on surface 601. Surface 601 has a plurality of protrusions, each of which has a top surface 603 and a side wall 605. In addition, polymer sheet has a surface 607 between two neighboring protrusions.

Nanoparticles 602 are disposed on top surface 603, side wall 605, and surface 607 between two neighboring protrusions.

In some embodiments, the polymer sheet prepared by the methods described herein can have superhydrophobicity. For example, the polymer sheet prepared by the methods disclosed herein can have a hydrophobic surface that has a water contact angle of at least about 150° (e.g., at least about 155°, at least about 160°, at least about 165°, at least about 170°, or at least about 175°) and/or at most about 179° (e.g., at most about 175°, at most about 170°, at most about 165°, or at most about 160°).

In some embodiments, the polymer sheet prepared by the methods described herein can have a hydrophobic surface that has a water slip-off angle of at most about 10° (e.g., at most about 5°, at most about 4°, at most about 3°, at most about 2°, or at most about 1°) and/or at least about 0.1° (e.g., at least about 0.5°, at least about 1°, at least about 1.5°, at least about 2°, or at least about 2.5°).

In some embodiments, the polymer sheet prepared by the methods disclosed herein can have superior abrasion resistance. For example, the polymer sheet prepared by the methods disclosed herein can have a hydrophobic surface that has a water contact angle of at least about 150° (e.g., at least about 155°, at least about 160°, at least about 165°, at least about 170°, or at least about 175°) after 1,000 abrasion cycles (e.g., after 5,000 abrasion cycles, after 10,000 abrasion cycles, after 50,000 abrasion cycles, or after 100,000 abrasion cycles) under a pressure of 32 KPa. As another example, the polymer sheet prepared by the methods disclosed herein can have a hydrophobic surface that has a water contact angle of at least about 150° (e.g., at least about 155°, at least about 160°, at least about 165°, at least about 170°, or at least about 175°) after the hydrophobic surface is scratched by a steel nail at least 10 times (e.g., after 20 times, after 30 times, after 40 times, or after 50 times). In some embodiments, the polymer sheet prepared by the methods disclosed herein can be touched or handled by hand without damaging its superhydrophobic surface.

In some embodiments, the polymer sheet prepared by the methods described herein has superior static water pressure resistance. For example, the polymer sheet prepared by the methods disclosed herein can have a hydrophobic surface that remains dry (e.g., having a layer of air between the superhydrophobic surface and water) under a water pressure of at least about 8 psi (e.g., at least about 10 psi, at least about 20 psi, at least about 40 psi, at least about 60 psi, or at least about 85 psi) for at least about 5 hours (e.g., at least about 10 hours, at least about 20 hours, at least about 30 hours, at least about 40 hours, or at least about 50 hours).

In some embodiments, the polymer sheet prepared by the methods described herein can have superior dynamic water pressure resistance. For example, the polymer sheet prepared by the methods disclosed herein can have a hydrophobic surface that remains dry upon impact of a water droplet at a speed of at least about 5 m/s (e.g., at least about 6 m/s, at least about 7 m/s, at least about 8 m/s, at least about 9 m/s, or at least about 10 m/s).

While a free-standing polymer sheet has been described as an example on which a superhydrophobic surface can be formed, the methods described herein can also be used to form a superhydrophobic surface on other substrates. For example, the methods described herein can be used to form a superhydrophobic surface on a free-standing polymer sheet or film first. The free-standing polymer film or sheet thus formed can then be adhered to the surface of another substrate (e.g., a metal, glass, polymer or ceramic substrate) by using an adhesive to form a composite material having a superhydrophobic surface. In some embodiments, the methods described above can be used to directly form a superhydrophobic surface on a polymer layer coated or adhered on a substrate (e.g., a metal, glass, polymer or ceramic substrate) to form a composite material having a superhydrophobic surface.

The superhydrophobic surface prepared by the methods described herein can be used in food-processing equipment due to its excellent non-wetting, self-cleaning properties. In addition, the superhydrophobic surface prepared by the methods described herein can be used in roofing, wind turbines, aircraft, and naval structures due to its excellent ice-repellent properties.

Isolated Photocatalytic Regions on a Superhydrophobic Surface

Also disclosed in this specification are polymer composite materials that provide isolated photocatalytic regions on a superhydrophobic surface. Although superhydrophobicity can be demonstrated with untreated metal oxide particles, these superhydrophobic properties may be lost upon exposure to ultraviolet (UV) light. In one embodiment, the stability of the superhydrophobic properties is increased by providing hydrophobic regions on the surface that are a mix of hydrophobic nanoparticles (e.g. silane treated $SiO_2$) with hydrophilic particles (e.g. $TiO_2$). Alternatively, hydrophobic particles can be bonded to select regions on the surface of a hydrophobic polymer. For example, a stable superhydrophobic surface can be formed where hydrophilic catalyst particles are isolated into specific regions, leaving a continuous web of hydrophobic material. In this way, the receding contact angle of the drop moving along the surface would be discontinuous, minimizing the energy required for droplet movement. Four methods for fabricating polymer-based hybrid superhydrophobic surfaces with isolated photocatalyst regions are shown schematically in FIGS. 8A-8F, FIGS. 8G-8H, FIGS. 9A-9C, FIGS. 10A-10E and 11A to 11C. Generally, inorganic photocatalytic nanoparticles (e.g. $TiO_2$, ZnO, $V_2O_5$ nanoparticles or nanofibers and their derivatives, or glass particles that contain photocatalytic compounds such as Si-Phthalocyanine) can be used as the photocatalyst to make isolated patterns on a hydrophobic surface. The size of the photocatalytic nanoparticles can range from 1-1000 nm. The hydrophobic area can be generated using hydrophobic nanoparticles, such as $SiO_2$ or directly using the polymer substrate, which is either intrinsically hydrophobic or modified to be hydrophobic. The size of the $SiO_2$ nanoparticles can range from 1-1000 nm. Any thermoplastic polymer, including PE, PMMA, PVC, PTFE, PS, can be used as a polymer substrate. In addition, B-staged thermosetting polymers, such as epoxy laminates or rubber, could also be used.

Figure 7:
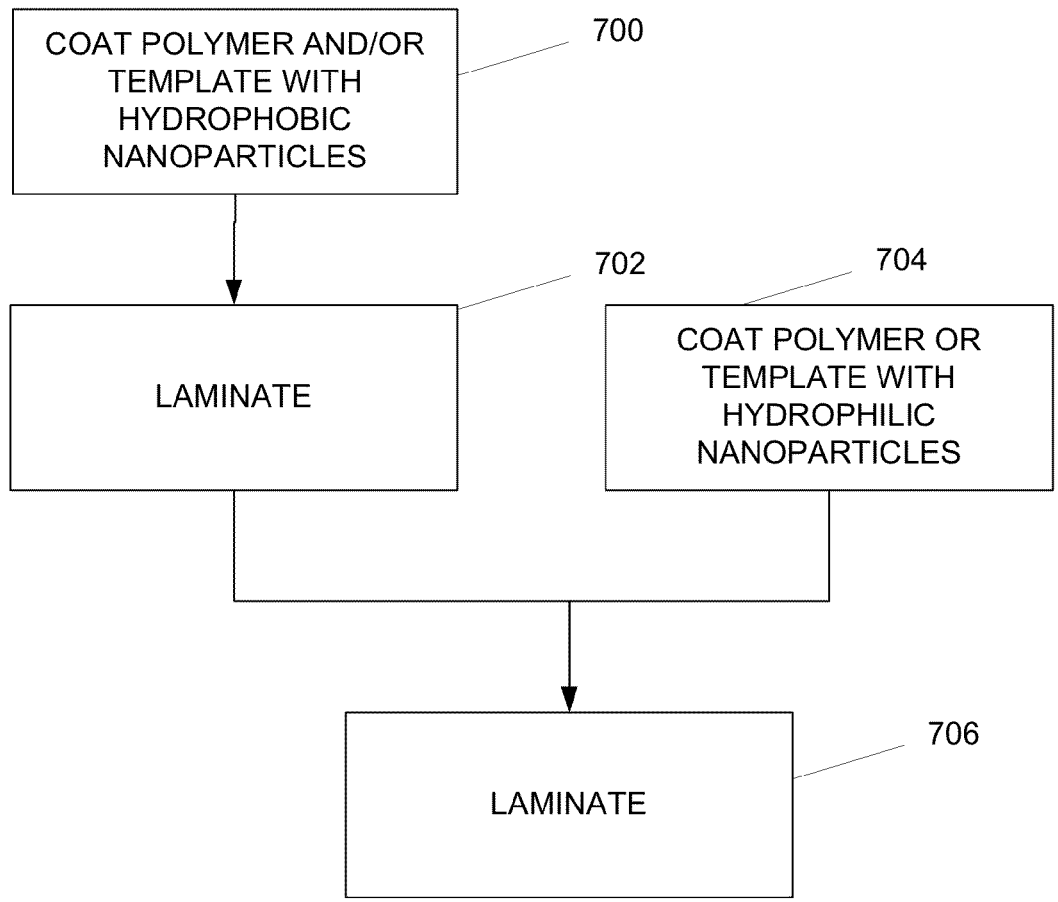
FIG. 7 is a flow diagram one exemplary method.

Referring to FIG. 7 in step 700 hydrophobic nanoparticles are spread uniformly on a laminator plate and/or a template. In step 702 the hydrophobic particles are laminated onto a polymer. Excess (non-embedded) hydrophobic nanoparticles may be removed after the lamination step. The average thickness of the layer of hydrophobic nanoparticles is at least 0.5 micrometers.

In step 704 hydrophilic nanoparticles are spread uniformly on a laminator plate. The average thickness of the layer of hydrophilic nanoparticles is at least 0.5 micrometers. The polymer sheet from step 702 is then placed on the hydrophilic particles and laminated in step 706. The temperature is above the glass transition temperature (Tg) of the polymer and, for crystalline polymer, above the melting temperature (Tm). Sufficient pressure is applied to insure that the hydrophilic particles are in intimate contact with the polymer surface, however excessive pressure is avoided as this high pressure may compact the nanoparticle layers excessively, preventing the polymer from infiltrating into the pores between particles. By controlling the lamination conditions such as the temperature, pressure, and time for each step, the surface microstructures as well as the contents of the polymer composite materials can be finely adjusted. The process can be used to make free-standing photocatalytic polymer composite films.

Figure 8A:
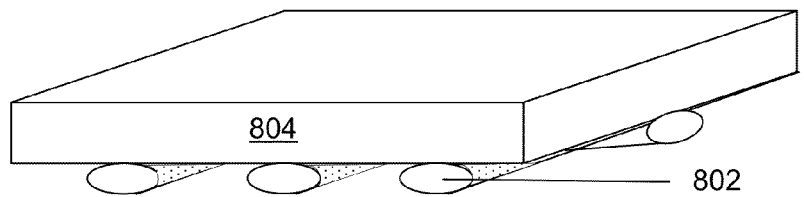
FIGS. 8A, 8B and 8C are schematic depictions of one method of forming a polymer surface.

Referring to FIG. 8A, a template is used to create a surface with hierarchical roughness. In the exemplary embodiment both a polymer 800 and the template 802 are coated with a dispersion of hydrophobic nanoparticles in a liquid carrier (for example, silica nanoparticles in alcohol).

Figure 8B:
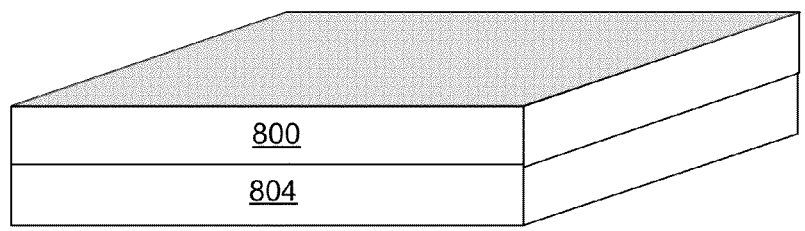

In FIG. 8B, after drying, the polymer 800 and template 802 are then stacked between plates 804 and laminated under heat and pressure for a given time.

Figure 8C:
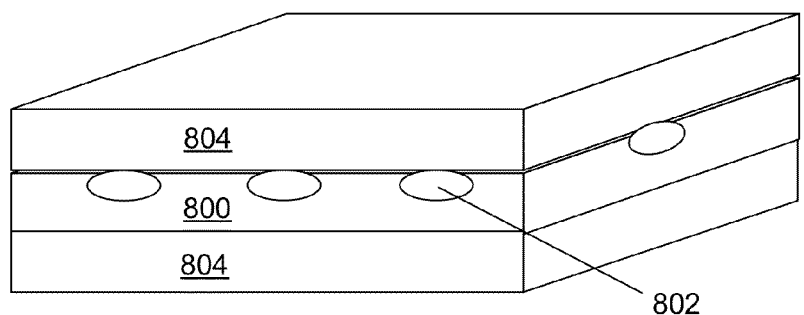

In FIG. 8C, the assembly is then cooled and excess hydrophobic particles are removed (e.g. blowing with clean compressed air), however the template 802 remains embedded into the polymer 800. At this stage of the process, before the template 802 template is removed, the surface has two layers of roughness. The primary roughness is formed by the ridges (formed as the polymer 800 flows through the pores in the template 802) and recessed grooves (visible after the mesh is removed) provided by template 802. The secondary roughness is formed by individual and aggregated hydrophobic nanoparticles adhered onto the polymer surface. In addition, the polymer 800 may flow into the pores between some hydrophobic nanoparticles. The polymer 800 adheres well to the hydrophobic nanoparticles, bonding them tightly to the surface which increases overall secondary roughness. After the first lamination step, excess hydrophobic nanoparticles may be removed, however the template is left partially embedded into the polymer 800.

Figure 8D:
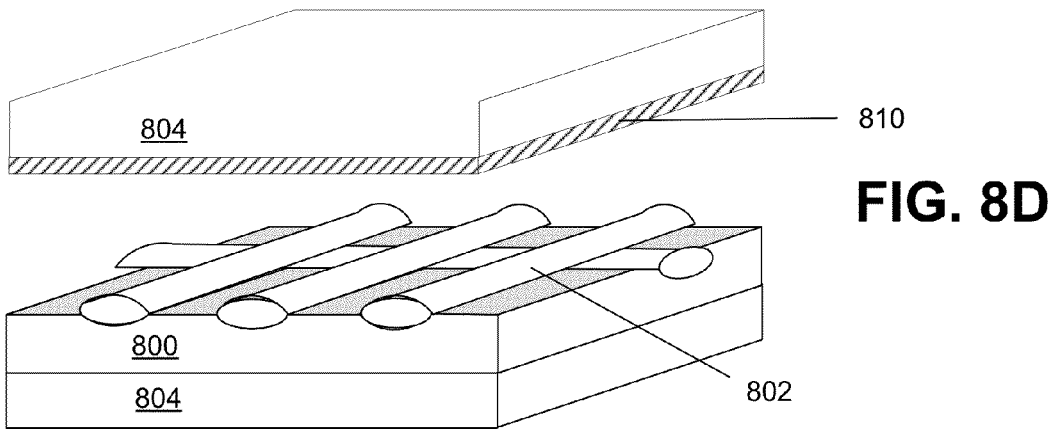
FIGS. 8D, 8E and 8F are schematic depictions of one method of modifying a polymer surface.
Figure 8E:
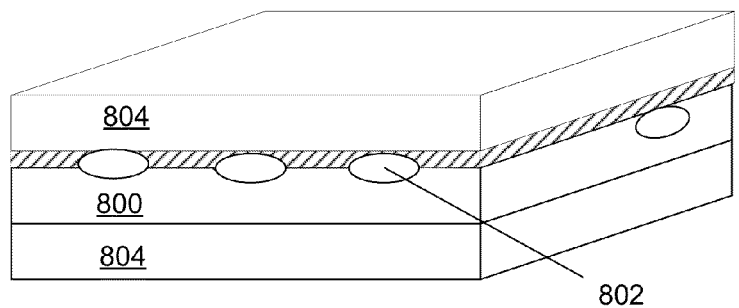
Figure 8F:
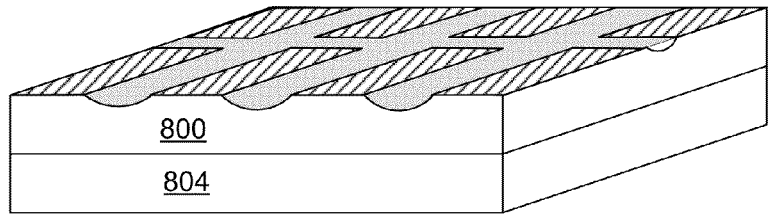

As shown in FIG. 8D, in the second lamination step, the polymer 800 (with template) is pressed against a layer 810 of catalytic nanoparticles (e.g. $TiO_2$). The catalytic nanoparticles may have either hydrophobic or hydrophilic surfaces. The layer 810 of the catalytic nanoparticles can be applied with a blade or other comparable coating method. In one embodiment, the thickness of the catalytic nanoparticles is at least 0.5 micrometers. The catalytic particles are laminated to the surface of the polymer (see FIG. 8E) only in the areas exposed by the pores in the template. The wires which form the template exclude the catalytic particles from the grooves—thus insuring that the grooves are coated only with hydrophobic nanoparticles. In the last step, the assembly is cooled and the mesh template separated from the polymer. This exposes the fabricated surface with isolated catalytic regions, which are raised relative to the grooves coated primarily with hydrophobic nanoparticles. See FIG. 8F. If desired, excess nanoparticles can be removed by washing or blowing with compressed air.

Figure 8G:
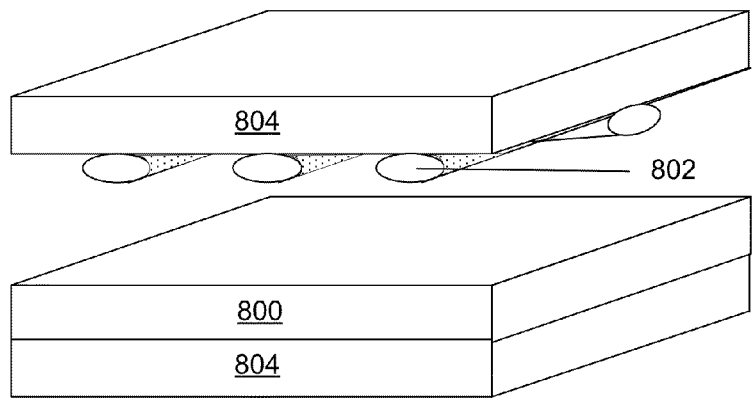
FIGS. 8G, 8H and 8I are schematic depictions of another method of forming a polymer surface.
Figure 8H:
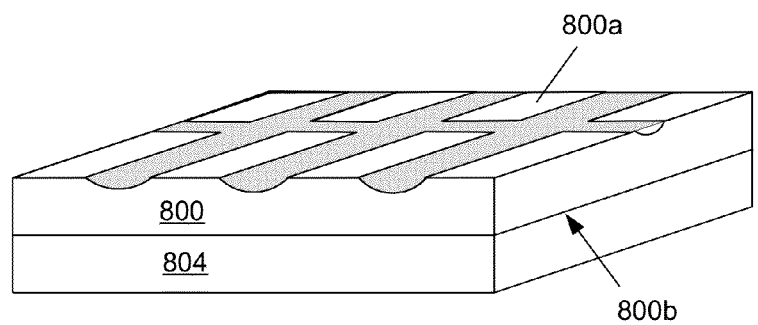
Figure 8I:
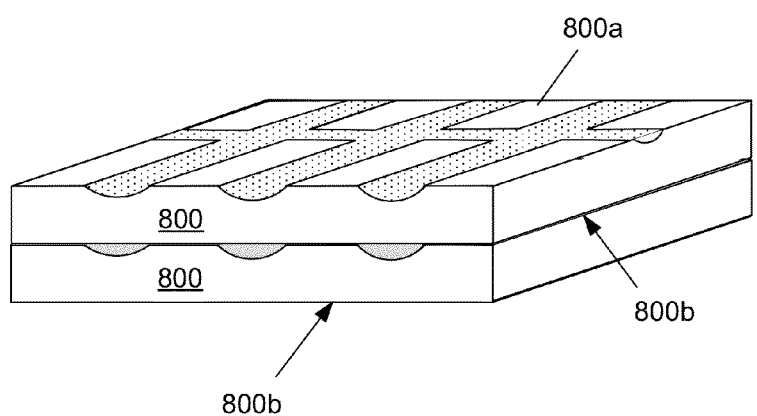

An alternative method is depicted in FIG. 8G and FIG. 8H. FIG. 8G is similar to FIG. 8A except in that only the template 802 is coated with nanoparticles. The resulting film, shown in FIG. 8H is similar to the film of FIG. 8F except in that only the grooves of the polymer 800 have been coated with nanoparticles. The top surfaces of the protrusions are substantially free of the nanoparticles. Advantageously, this permits the film of FIG. 8H to be stacked atop other polymers. See FIG. 8I.

For example, two such layers of the treated polymer 800 may be stacked. The top surface 800a of a first polymer provides an exposed surface to which a bottom surface 800b of a second polymer can adhere. This is advantageous for certain embodiments. For example, multiple rolls of the polymer film of FIG. 8F may be provided which have a predetermined width. Two such rolls may be placed adjacent one another to cover a wider area. The edges of the two rolls may be caused to overlap to prevent leaks through the crack between the rolls. However, the nanoparticles of the lower roll may cause the lower layer to not be securely attached to the upper roll. In such an embodiment, the edges of at least the lower roller may be modified in accordance with FIG. 8H to provide an exposed polymer top surface 800a. In this fashion the lower roller and the upper roll may be attached at their edges while presenting a modified surface (e.g. FIG. 8F) elsewhere on the rolls. In one embodiment, heat treatment is used to cause polymeric material within the exposed surface 800a to form a diffusion bond with the exposed surface 800b with which it is in contact. This permits two adjacent rolls to form a secure seal at their overlapping edges (e.g. FIG. 8H) while still presenting a treated surface (e.g. FIG. 8F) to be presented to the environment at the remaining portions of the rolls.

Figure 9A:
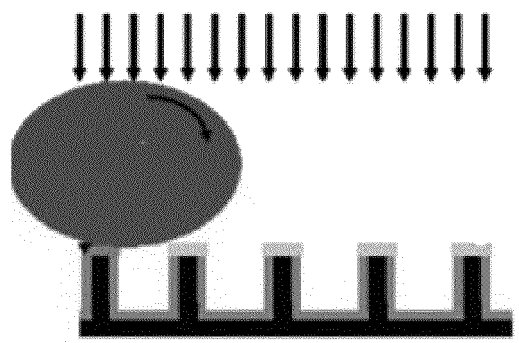
FIGS. 9A, 9B, 9C and 9D is a schematic depiction of a liquid rolling over a modified surface.
Figure 9B:
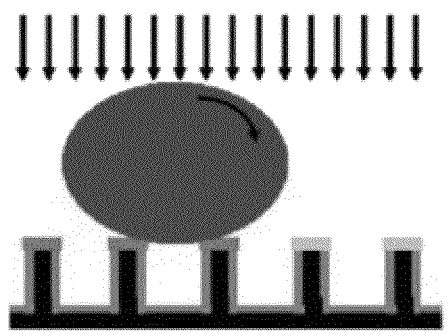
Figure 9C:
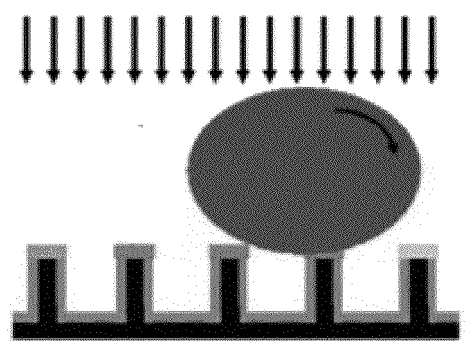
Figure 9D:
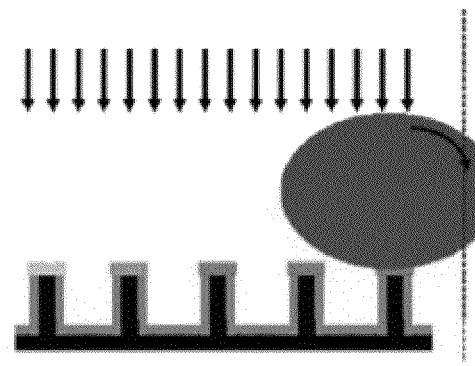

Without wishing to be bound to any particular theory, Applicant believes the hydrophilic/hydrophobic surfaces provide unusual chemical properties to the surface. For example, the surfaces disclosed in this specification can be used for efficient photooxidation of organic contaminants for the purpose of water purification. A schematic of the process is shown in FIGS. 9A, 9B, 9C and 9D. A superhydrophobic surface with isolated photocatalyst regions is illuminated with light. Water droplets containing organic contaminants are placed onto this superhydrophobic surface. When the surface is titled at a sufficient angle, these droplets can roll along the surface. As the droplet rolls, a small amount of fluid (less than or equal to 10 nanoliters) is deposited onto each of the photocatalyst regions as shown in FIGS. 9A, 9B and 9C. Such a small amount of fluid would result in the organic molecules coming into contact and/or being absorbed rapidly by the photocatalyst as the catalyst-containing regions become hydrophilic under the light illumination. This intimate contact between organic molecule and catalytic surface under ultraviolet/visible light illumination results in accelerated photodegradation rates. If the vapor pressure of water in the gas phase above the surface was sufficiently low, the water would quickly evaporate from these catalytic regions, bringing all the organic molecules into contact with the catalytic surface. The process is repeated as the next droplet interacts with the cleaned surface. Thus the retention of nanoliters of fluid leads to the concentration of organic molecules on the surface and enhanced photodegradation rates. Evaporation of the retained fluid further enhances reaction rates.

Figure 10A:
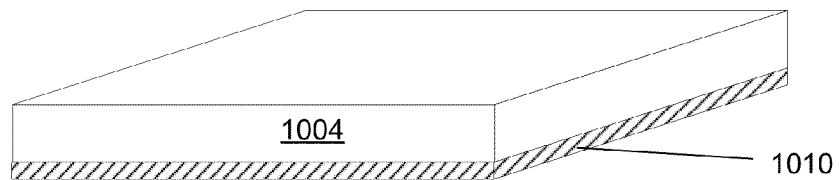
FIGS. 10A, 10B and 10C are schematic depictions of one method of modifying a polymer surface.
Figure 10B:
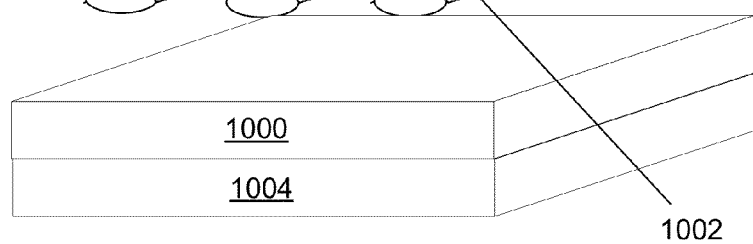
Figure 10C:
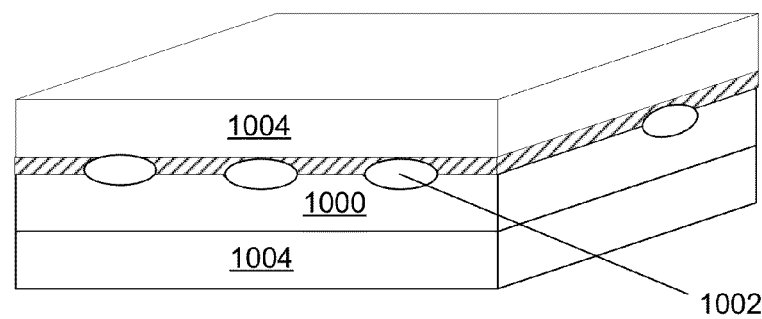

In the alternative method for forming such surfaces shown in FIG. 10A, FIG. 10B and FIG. 10C, the polymer 1000, photocatalytic nanoparticles 1010 and template 1002 are stacked. The thickness of the photocatalytic nanoparticles was at least 0.5 micrometers. After lamination between plates 1004 and cooling, a surface with two layers of roughness is formed. In the depicted embodiment, the primary roughness is created by embossing the wire mesh into the polymer surface forming an array of grooves with dimensions similar to the template and raised areas formed as the polymer flow through the relatively large pores of the template and into the fine pores between nanoparticles. In this case, the groves are not coated with nanoparticles. The secondary roughness is formed by individual and aggregated nanoparticles adhered onto the polymer surface. In addition, the polymer may flow into the pores between some nanoparticles increasing the secondary roughness. After the template is removed, the catalytic particles are isolated in the raised polymer areas (polymer posts) which are surrounded by hydrophobic polymer grooves. The dimensions of the raised polymer regions coated with catalyst nanoparticles (polymer posts), as well as the dimensions of the grooves, can be adjusted by using different templates. The photocatalytic properties rely on the isolated regions coated with photocatalytic nanoparticles, while the superhydrophobic properties mainly rely on the three-dimensional polymer post structures. Because the surface of the polymer is either intrinsically hydrophobic (FIG. 10C) or modified to be hydrophobic, the superhydrophobicity and the photocatalytic properties can be concurrently achieved by finely controlling the three-dimensional microstructures of the surface without using the hydrophobic nanoparticles.

Figure 11A:
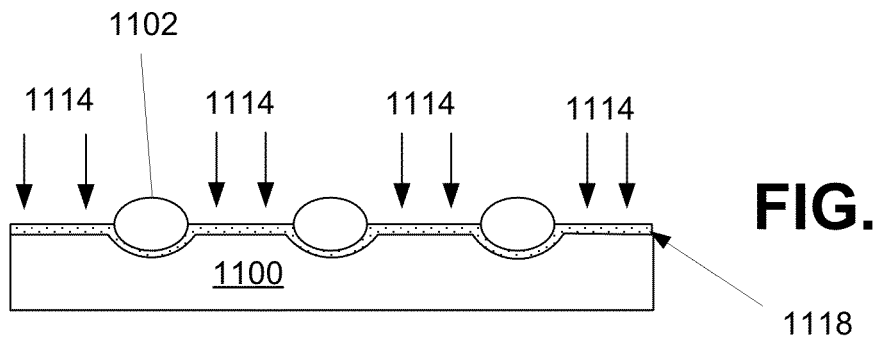
FIGS. 11A; 11B; 11C and 11D are schematic depictions of one method of modifying a polymer surface.
Figure 11B:
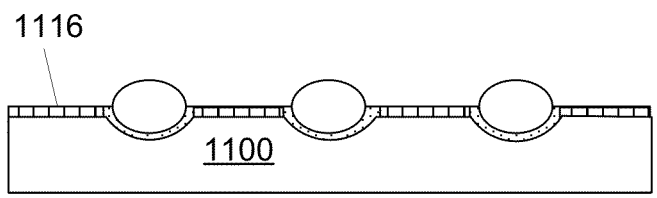
Figure 11C:
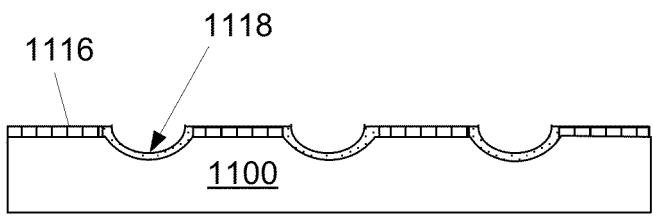
Figure 11D:
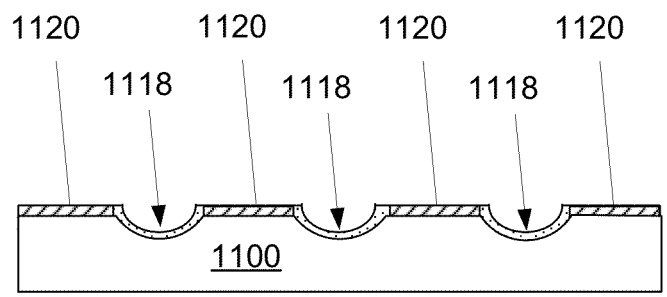

In the alternative method shown in FIG. 11A, FIG. 11B and FIG. 11C, a polymer nanocomposite surface with hierarchical roughness (e.g. primary and secondary roughness) is manufactured. An intermediate (e.g. see FIG. 8C) with a template 1102 embedded in a polymer 1102 and a hydrophobic nanoparticle surface 1118 is provided. The exposed surface 1114 is then treated with oxygen, air plasma or other suitable oxidant while the template remains embedded in the polymer to generate superhydrophilic regions 1116 (FIG. 11A). Thus the template serves two roles: as a template for embossing the polymer surface to create primary roughness and as a mask to enable the selective oxidation of the polymer surface. See FIG. 11B. Subsequently, the template 1102 is removed (FIG. 11C) to expose the superhydrophobic area 1118 under the template. Hydrophilic nanoparticles may be self-assembled onto the newly formed superhydrophilic regions by coating with an aqueous dispersion of the hydrophilic nanoparticles (for example, by rolling water droplets containing $TiO_2$ nanoparticles along the superhydrophobic-superhydrophilic hybrid surface) to produce the product of FIG. 11D. Finally the technique of percolative infiltration is used again for anchoring the self-assembled hydrophilic nanoparticles to the polymer.

Figure 12A:
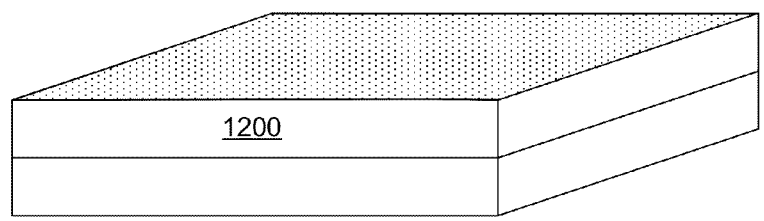
FIGS. 12A, 12B, 12C and 12D are schematic depictions of one method of modifying a polymer surface.
Figure 12B:
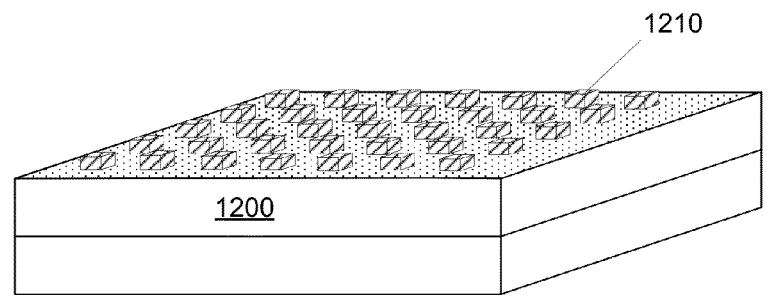
Figure 12C:
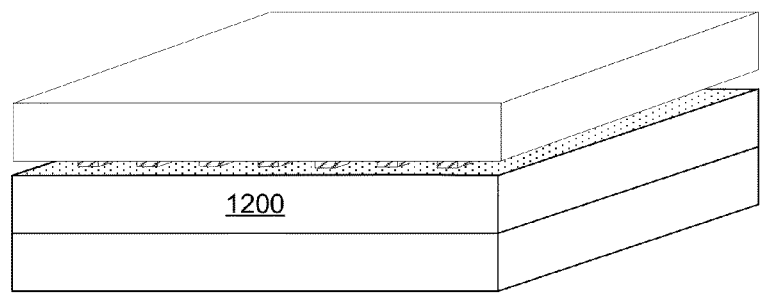
Figure 12D:
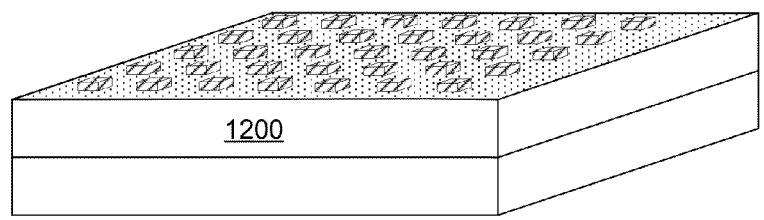

Yet another method is shown in FIGS. 12A to 12C. A coating of hydrophobic nanoparticles (see FIG. 12A) is first applied onto the polymer 1200. The thickness of the hydrophobic nanoparticles layer is controlled to be 0.5-1000 micrometers. Onto this hydrophobic surface, regions of photocatalytic nanoparticles 1210 can be formed into a dot pattern by using an appropriate printing technique (e.g. inkjet, stamp, stencil or screen printing). See FIG. 12B. The diameter of each region with catalytic nanoparticles can range from 1-1000 micrometers, and the pitch of the photocatalytic nanoparticles dots could range from 1-1000 micrometers. After printing, the hydrophobic nanoparticles are bonded to the polymer by laminating under heat and pressure (see FIG. 12C). The sample is then cooled with or without pressure. FIG. 12D.

These exemplary methods can be used to make free-standing films of hybrid superhydrophobic and photocatalytic surfaces. By including a substrate and adhesive layer, the hybrid superhydrophobic and photocatalytic surfaces could be bonded to a substrate such as metal (e.g. aluminum) or a composite (e.g. epoxy-glass). The template could be made from polymers, fabrics, or metals. The pore size of the templates may range, for example, from 1-800 micrometers and the average pitch of the pores can range from 1-800 micrometers. Templates made with finer pores and smaller wires could also be used. The lamination temperature generally is between 100-450° C. and the pressure generally between from 0.5-10000 psi. These values will depend upon the polymer used as well as the depth of the desired grooves. By controlling the lamination conditions such as temperature, pressure, and time for each step, the surface microstructures as well as the contents of the polymer composite materials can be finely adjusted for achieving the desired performance.

Application—Water Purification

Conventional photocatalytic films or powders exhibit low photooxidation efficiencies (especially at low pollutant levels, e.g. one ppm and lower). The low efficiency of these films results, in part, from the slow rate at which the organic contaminant can contact the photocatalytic particles on the surface. Since the conventional films are hydrophilic, a static boundary layer is formed as fluid flows along the surface. Once the contaminant molecules within the boundary layer are decomposed, additional molecules must diffuse across the static boundary layer. The present technique, using a superhydrophobic surface with isolated photocatalyst regions, overcomes this limitation. As a droplet moves along the surface of a conduit, fluid with contaminant molecules is continuously brought into close proximity with the catalyst.

Figure 13A:
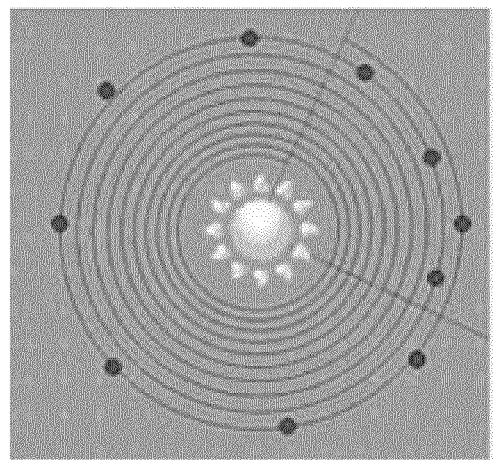
FIGS. 13A and 13B are top and side views, respectively, of an exemplary water treatment apparatus.
Figure 13B:
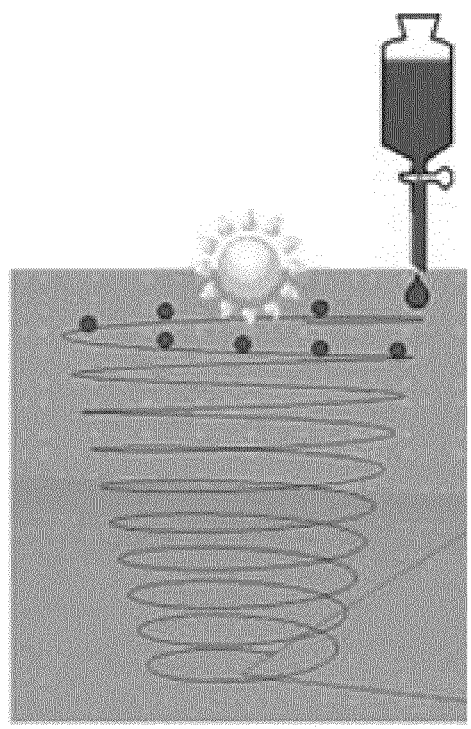

In one embodiment, a system is designed in which droplets repeatedly contact the superhydrophobic-catalytic surface. In one embodiment, the surface is mounted onto a tilting or reciprocating platform such that droplets flow either back and forth across, or in a circular motion around, the surface. In another embodiment, the surface is formed into either a helical or spiral conduit; a spiral conduit is shown schematically in FIG. 13A and FIG. 13B. In this way a continuous stream of droplets can travel along the superhydrophobic conduit where the conduit surface is continuously exposed to light. Travel of droplets along a conduit surface is greatly facilitated by the superhydrophobic properties; superhydrophobicity reduces the inclination angle required for the conduit, allowing more turns to be achieved within a given height. In addition, it avoids the formation of static boundary layers which would reduce photooxidation rates. If the fluid is not fully oxidized at the bottom of the spiral, it can be pumped back to the upper reservoir for re-treatment. Alternatively, the length of the conduit could be increased. A superhydrophobic surface can be made into a helical or spiral conduit suitable for use with the embodiment of FIGS. 13A and 13B by conducting the lamination steps using a mold, or mandrel, to form the polymer into an open conduit. For example, the lower plate could be made into the form of a curved concave surface whereas the upper steel plate could be formed into a mating curved convex surface. After processing, a curved semi-circular conduit would be formed with an interior superhydrophobic surface containing regions of a photoactive catalyst. The ends of the curved conduit sections could be joined together (either using a connector or adhesive) to form a helical conduit. Alternatively, the mold could be made such that a two-dimensional spiral could be formed. A three-dimensional spiral could then be created by stretching the 2D spiral. This would be facilitated by using a tough thermoplastic polymer such as polyethylene. The hybrid nanocomposite conduit could be bonded to a metal substrate and then bent into the appropriate form. This conduit could either be self-supporting, or attached to the inside of a cylinder, to form a continuous path where the entire surface, which contacts water, would be constantly irradiated with light. By enclosing within a cylinder, water that evaporates from the drops could be condensed and collected providing a source of purified drinking water. To accelerate this process, the vapor pressure of water would be reduced, further encouraging evaporation. This lowered vapor pressure would also accelerate the concentration of the organic chemicals, on the catalyst particles. If volatile contaminants are present, the vapor pressure of water in the gas phase could be increased to minimize water evaporation. Drops of a fluid may be introduced at the top of the conduit. The drop size, the spacing between drops and the overall length of the conduit would be controlled to insure efficient photooxidation of the organic contaminant. When droplets reached the end of the conduit they could be tested for contaminant concentration. This could be done, for example, by Raman spectrometry. If the concentration of contaminant is too high, the liquid could be pumped to the top of the helix and re-treated. Any source of radiation with sufficient energy to activate the catalyst particles could be used. For example, either natural sunlight or ultraviolet lamps could be used.

EXAMPLES

Example 1

Fabricating Polymer Sheets Having a Superhydrophobic Surface by Using a Template Materials, methods and surface fabrication: A commercially available thermoplastic sheet of low density polyethylene (LDPE) manufactured by Berry Plastics (Evansville, Ind.) from 97% recycled polyethylene, 2% calcium carbonate and 1% slip oleamide and sold through McMaster-Carr was used as the polymer substrate. The thickness of the LDPE film was 100 micrometers and 10 layers of the LDPE film were used at each time to make free-standing superhydrophobic sheets that were approximately 1 mm thick. The polymer film softens at 106° C. and melts over the range from 113-120° C. Three types of stainless steel mesh (i.e., M1, M2, and M3) and one type of nylon mesh (i.e., M4) (all from McMaster-Carr) with different wire diameters and pore sizes were used as templates. The structures and details of the mesh are shown in Table 1 below.

TABLE 1

Parameters of mesh templates for fabricating superhydrophobic surfaces.

| Mesh NO. | Wire Diameter 1 (μm) | Wire Diameter 2 (μm) | Square pore side length (μm) | Open Area (%) |
|---|---|---|---|---|
| M1, 325 mesh | 28 | 28 | 50 | 41 |
| M2, 400 mesh | 75 | 25 | 38 | 36 |
| M3, 200 × 1400 mesh | 71 | 41 | 10 | 2 |
| M4, 371 mesh | 33 | 33 | 36 | 28 |

The procedure for fabricating superhydrophobic surfaces involved two processing steps. In the first step, a stack of LDPE sheets and a mesh template are laminated together under heat and pressure with the targeted polymer surface facing the mesh template. The stack-up was heated above its softening temperature under pressure for 3-30 minutes. The laminated stack was then cooled to 25° C. In the second step, the mesh template was separated from the polymer film by peeling. The superhydrophobic surface was formed and exposed during the peeling process. As the LDPE did not adhere to the stainless steel or Nylon mesh, the template could be reused. The fabrication conditions of the above process are summarized in Table 2.

TABLE 2

Fabrication conditions for surface 1-4 and their superhydrophobic properties.

| Surface # | Mesh # | Lamination Conditions Temp °C. | Pressure kPa | Time Min | Peel Temp °C. | Superhydrophobicity $\theta_{Static}$ | $\theta_{Adv}$ | $\theta_{Rec}$ | $\theta_{Slip}$ |
|---|---|---|---|---|---|---|---|---|---|
| S1 | M1 | 115 | 1400 | 30 | 25 | 125° | — | — | — |
| S2 | M1 | 120 | 1400 | 30 | 25 | 160° | — | — | 3° |
| S3 | M1 | 125 | 1400 | 3 | 25 | 160° | — | — | 5° |
| S4 | M2 | 125 | 69 | 15 | 25 | 160° | 163° | 155° | 5° |
| S5 | M3 | 125 | 69 | 15 | 25 | 158° | — | — | 3° |
| S6 | M4 | 125 | 69 | 15 | 25 | 160° | 162° | 157° | 5° |

Figure 14:
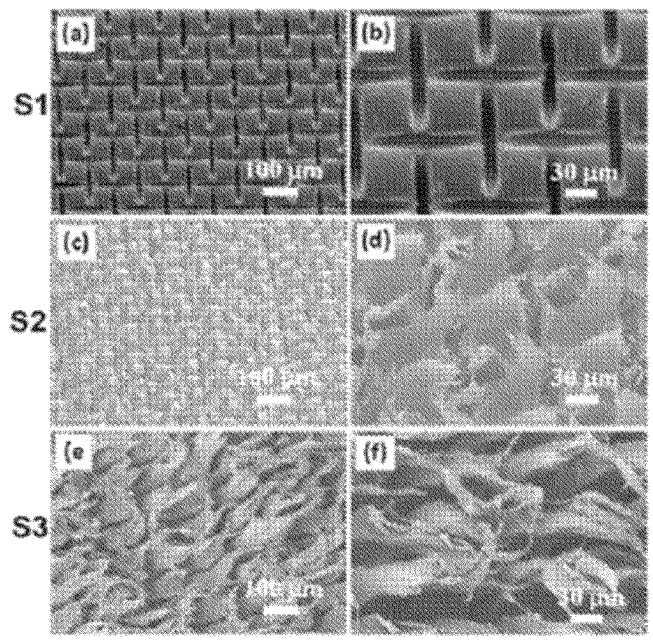
FIG. 14 illustrates six panels (a-f) of SEM images of surfaces fabricated in Example 1 by using mesh 1 (M1) at different temperatures under the same pressure: (a,b) surface SI, 115° C. (c,d) surface S2, 120° C., and (e,f) surface S3, 125° C. Panels b, d, and f are higher magnification views of panels a, c, and e, respectively.
Figure 15:
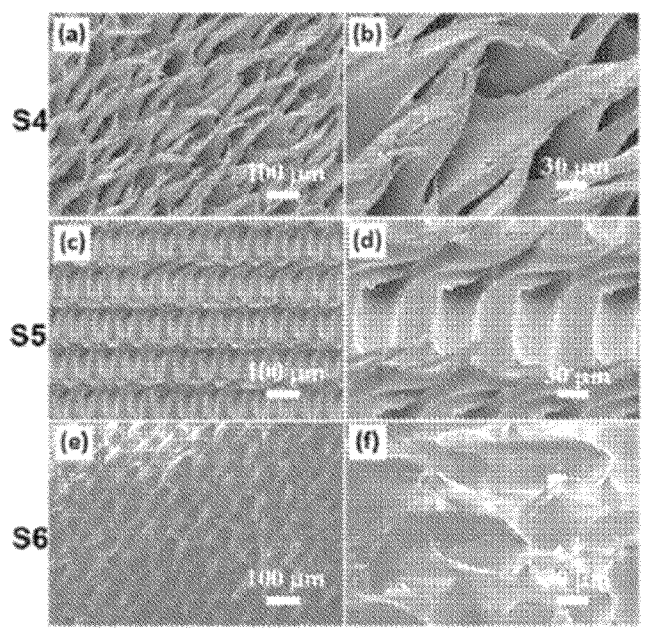
FIG. 15 illustrates six panels (a-f) of SEM images of surfaces fabricated in Example 1 by using different mesh templates at the same lamination temperature and pressure: (a,b) surface S4 made from mesh 2 (M2), (c,d) surface S5 made from mesh 3 (M3), and (e,f) surface S6 made from mesh 4 (M4). Panels b, d, and f are the higher magnifications of panels a, c, and e, respectively.

Characterization: The surface structures were studied by field emission scanning electron microscopy (FESEM, Amary) and optical microscopy (Nikon-SMZ 1500 and Laborlux-12ME). The SEM images are shown in FIGS. 14 and 15.

The static contact angles (CAs) and roll-off angle were measured with a goniometer (250-F1, Rame-Hart Instruments Co). Droplets of distilled water, with a volume of 2-5 microliters, were placed gently onto the surface at room temperature and pressure. The static CA and advancing and receding CAs were measured five times at different locations such that the measurement variance was ±2°. The slip-off angle was determined by measuring the substrate angle at which water droplets (about 10 microliters,) placed on the surface with a micro syringe needle would roll-off the surface. The results are summarized in Table 2. As shown in Table 2, surfaces S2-S6 were superhydrophobic surfaces having a water contact angle ranging from 158-160° and a water slip-off angle less than 5°. Without wishing to be bound by theory, it is believed that S1 did not form a superhydrophobic surface because the lamination temperature was not sufficiently high to allow the mesh template to be fully embedded into the LDPE. Since the polymer did not flow through the pores of the mesh, the polymer was not stretched and torn when the mesh was peeled off the polymer. As a result, the aspect ratio of the embossed features is not sufficient to create roughness adequate to exhibit superhydrophobicity.

Figure 16:
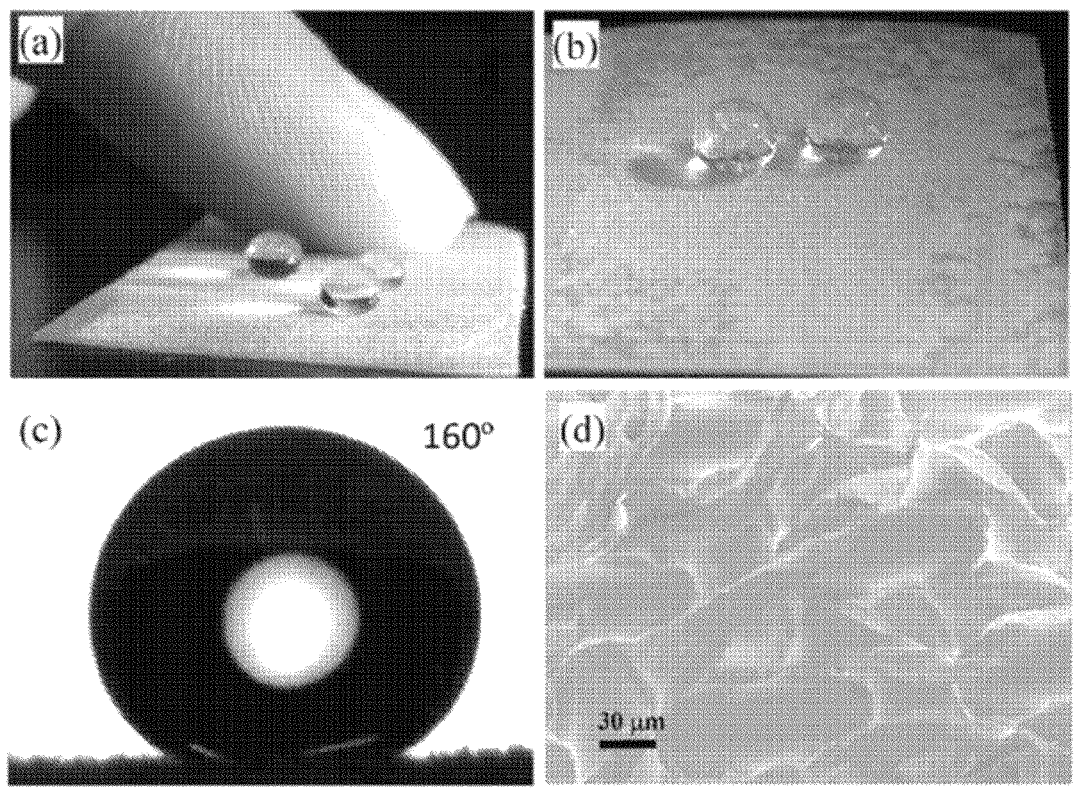
FIG. 16 illustrates four images (a-d) of surface S6 in Example 1 after manual abrasion testing: (a) being an image of S6 touched with a bare finger, (b) being an image of water droplets on a partly dried surface S6 after a multi-step manual test, (c) being an image of water contact angle of surface S6 after the same multi-step manual test, in which the surface was rinsed with water and dried before measuring, and (d) being a SEM image of the surface structure of S6 after the same multi-step manual test, in which the surface was rinsed, dried and coated with gold before imaging.
Figure 17A:
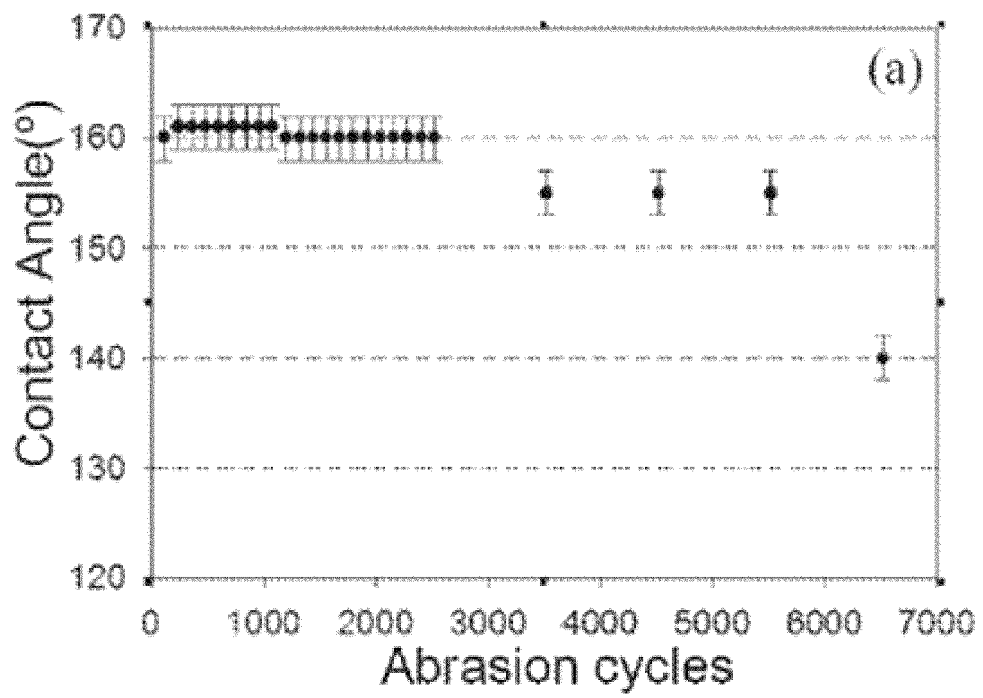
FIG. 17A is a graph showing that the water contact angle of superhydrophobic surface S4 in Example 1 as a function of abrasion cycles using the Taber reciprocating abraser under a pressure of 32.0 kPa.
Figure 17B:
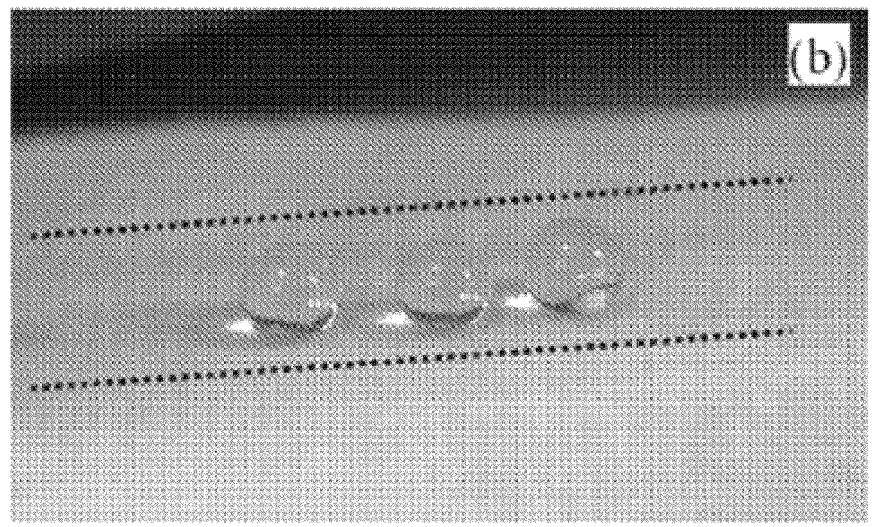
FIG. 17B is an image of water droplets on surface S4 after 2000 cycles of mechanical abrasion testing. The abrasion region lies between the two parallel dashed lines.

Abrasion tests: First, the surfaces S2-S6 were assessed qualitatively by simply pressing with a bare hand. It was found that the superhydrophobicity of surfaces S2 and S5 decreased dramatically as water droplets were pinned in the touched area, while the superhydrophobicity of surfaces S3, S4 and S6 remained unchanged after pressing with a bare hand as shown in FIG. 16, panel (a) (surface S6). Without wishing to be bound by theory, it is believed that the relative lack of stability of surfaces S2 and S5 may be due to the fact that S2 had relatively thin petal-like features, whereas S5 had a very low concentration of small features. By contrast, without wishing to be bound by theory, it is believed that surfaces S3, S4 and S6 had a superior stability as they had a higher surface density of larger, higher aspect ratio features.

The chemical and abrasion resistance of surfaces S4 and S6 was then studied further using a manual, multi-step test that includes a sequence of four steps: (1) dry abrading firmly with a gloved hand (Showa Best Glove part #6005 PF) using a back and forth movement for 50 times, (2) dry abrading firmly with a hand wearing an industrial cotton glove back and forth for 50 times, (3) wet scrubbing manually with a gloved finger for 1 hour (20 cycles @ 2-4 minutes/cycle) with a saturated industrial cleaner solution (ALCONOX—Powdered Precision Cleaner, containing 7-13% sodium carbonate, 10-30% sodium dodecylbenzenesulfonate, 10-30% tetrasodium pyrophosphate, and 10-30% sodium phosphate), and (4) ultrasonicating in the same saturated industrial cleaner solution for 5 hours (Branson 1200 ultrasonic cleaner,—150 watts). After this sequence of tests, the surfaces were rinsed with tap water and dried with filtered dry compressed air. Unexpectedly, the superhydrophobicity of surfaces S4 and S6 remained unchanged. As shown in FIG. 16, panel (b), two water droplets maintained a spherical shape on surface S6, which had been only partially dried with compressed air after testing. The static water contact angles of surfaces S4 and S6 remained essentially unchanged as shown in FIG. 16, panel (c). The slip-off angles of 10 microliters, water droplets on surfaces S4 and S6 increased slightly from 5° to 10°. Without wishing to be bound by theory, it is believed that the increased slip-off angle may result from a partial disordering of the polymer protrusions after these abrading and scrubbing tests as shown in FIG. 16, panel (d). The disorder would result in protrusions of varying heights and therefore at least some protrusions may be partially wetted by water droplets.

A mechanized abrasion test was conducted with a Taber model 5900 reciprocating abraser using a CS-8 WEARASER abradant to measure the abrasion resistance of surface S4. The following conditions were used for the abrasion test: the stroke length was 4 cm, the abrasion linear speed was 8 cms 1, and the applied pressure was 32.0 kPa (4.64 psi). The change in static contact angle on surface S4 with increasing abrasion cycles is shown in FIG. 10(a). As seen in this figure, the static contact angle remained essentially unchanged at 160° over the first 2520 abrasion cycles and then decreased slowly to 155° with increasing cycles. The slip-off angle remained unchanged after 2520 cycles and increased slowly with increasing abrasion cycles. After 5520 cycles, water droplets on the surface still appear as transparent balls (as shown in FIG. 10(b)). When the total number of abrasion cycles was increased to 6520, the contact angle decreased to 140° and then maintained this level with further abrasion cycles. Both the manual multi-step test and the mechanized reciprocating test demonstrate that the superhydrophobic surfaces possess good mechanical and chemical stability as well as excellent abrasion resistance.

Water pressure stability test: The water pressure stability of surface S2 was tested as follows: A piece of the fabricated superhydrophobic polymer sheet with a size of 25 mm×38 mm was placed inside a Nordson-EFD polypropylene syringe barrel, immersed in water, and capped with a piston. The syringe was then pressurized, using a Nordson-EFD regulated dispenser. The reflectivity at the interface between water and the superhydrophobic surface was monitored visually and recorded using a digital camera. After the pressure was relieved, the sample was removed from the water filled syringe and the wetting properties of the surface were measured using optical microscopy (Nikon-SMZ 1500 and Laborlux-12ME).

The results showed that, the reflectivity remained relatively stable to 140 kPa of applied pressure, but the reflected intensity gradually became weaker with increasing pressure. The reflective interface significantly faded when the applied pressure was increased to 550 kPa over a period of 90 seconds. In addition, the results show that, at a lower pressure of 55 kPa (i.e., 8 psi or the pressure at a depth of 5.6 m of water), surface S2 remained completely dry when it was removed after 5 hours of under-water immersion. In sum, the water pressure stability of the superhydrophobic surfaces described herein is significantly better than that of lotus leaves, as well as other reported polymeric superhydrophobic surfaces.

Example 2

Fabricating Polymer Sheets Having a Superhydrophobic Surface by Using a Porous Nanoparticle Layer Ultra-high-molecular-weight polyethylene (UHMWPE, McMaster Carr, Elmhurst, Ill.), was used as the polymer substrate as it is a well-known tough material with high abrasion resistance, a high level of crystallinity (up to 85%), and the highest impact strength of any thermoplastic polymer. In addition, the high melt viscosity limits the infiltration of the UHMWPE into the porous nanoparticle layer, thereby minimizing the number of particles engulfed (i.e., fully embedded) into the polymer during the lamination process. Experiments were conducted to characterize the effect of the lamination pressure on the morphology and wetting properties of UHMWPE nanocomposite surfaces prepared by the percolative infiltration of the polymer into the porous nanoparticle layer A total of nine samples were prepared under different conditions. Sample 1 was an original, untreated UHMEPE sheet. Sample 2 was made by heating a UHMWPE sheet to 154.4° C. for 30 minutes to melt the crystalline polymer without applying any pressure, and then cooling it to room temperature in air. Sample 3 was made by heating a UHMWPE sheet covered by a layer of nanoparticles (3 mm thick) to 154.4° C. for 30 minutes without applying any pressure, and then cooling to room temperature in air. Samples 4-9 were made by heating a UHMWPE sheet covered by a layer of nanoparticles (3 mm thick) to 154.4° C. for 30 minutes while being laminated under a pressure of 83 psi, 830 psi, 3,000 psi, 5,000 psi, 8,000 psi and 13,000 psi, respectively, and then cooling it to room temperature in air.

Figure 18:
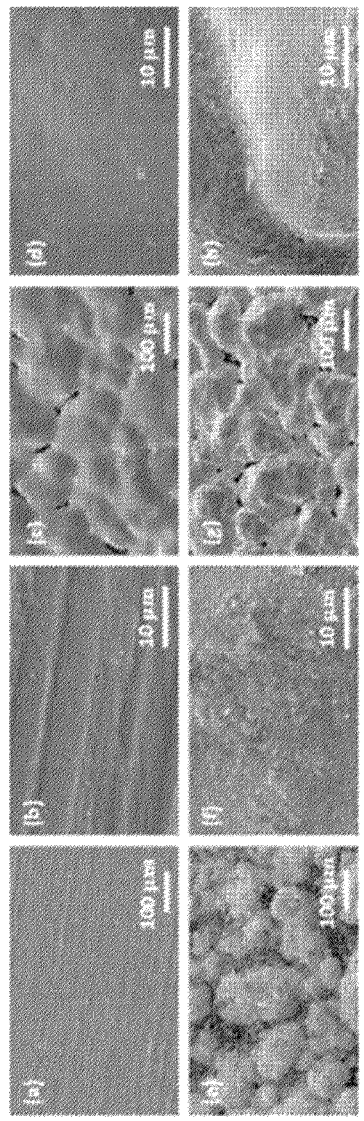
FIG. 18 depicts eight panels (a-h) of SEM images of Samples 1-3 in Example 2 after different treatments using UHMWPE as polymer substrate: (a, b) being the SEM images of an original UHMWPE substrate in Sample 1, (c, d) being the SEM images of the UHMWPE substrate in Sample 2 after heating to 154° C. and cooling to 25° C. (but without coating with a layer of nanoparticles), (e, f) being the SEM images of the UHMWPE substrate in Sample 3 (which was coated with a layer of nanoparticles) after heating to 154° C. and cooling to room temperature 25° C., and being before etched with a 49% HF acid for 8 hours, and (g, h) being SEM images of the UHMWPE substrate in Sample 3 after being etched with a 49% HF acid for 8 hours; Panels b, d, f, and h are higher-magnification views of panels a, c, e, and g, respectively.
Figure 19:
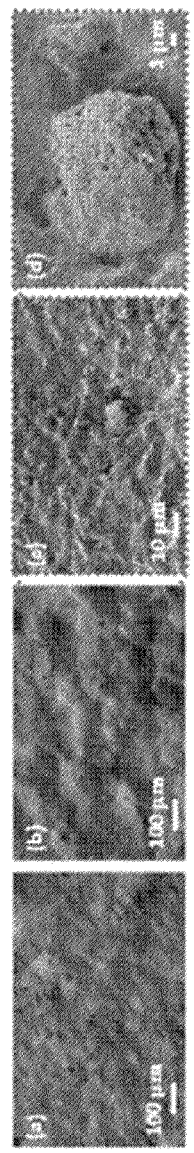
FIG. 19 depicts four panels (a-d) of SEM images of Sample 4 in Example 2 in which a polymer sheet and a layer of nanoparticles were laminated under a pressure of 83 psi: before (a) and after (b, c, and d) being etched with a 49% HF acid. Panel c is a higher-magnification view of panel b and panel d is the higher-magnification view of panel c.
Figure 20:
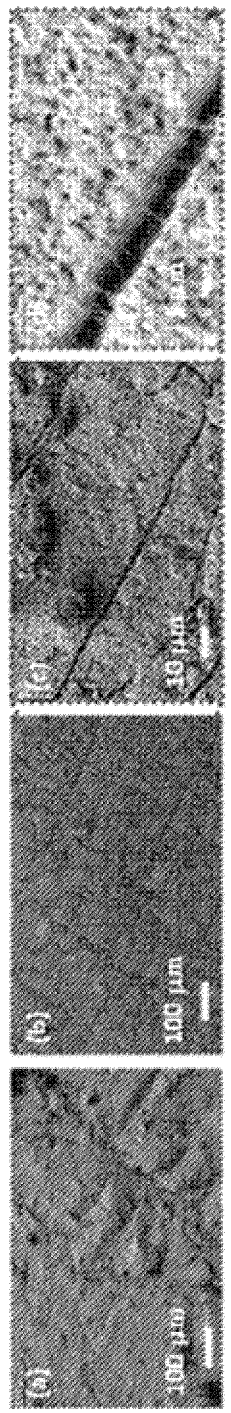
FIG. 20 illustrates four panels (a-d) of SEM images of Sample 8 in Example 2 in which a polymer sheet and a layer of nanoparticles were laminated under a pressure of 8000 psi: before (a) and after (b, c, d) being etched with a 49% HF acid. Panel c is the higher-magnification view of panel b and panel d is the higher-magnification view of panel c.

The lamination conditions and hydrophobic properties of these samples are shown in Table 3. The SEM images of the polymer sheet formed in Samples 1-4 and 8 are shown in FIGS. 18-20.

TABLE 3

Water contact angles and slip-off angles on different samples

| Samples# and Conditions | Water contact angle | Slip-off angle of droplets of 8 μL |
|---|---|---|
| 1. Original UHMW PE | 105 ± 2° | Not slip, |
| 2. Heating and Cooling | 123 ± 2° | Not slip, |
| 3. Heating and Cooling under the covering of Nanoparticles | 153 ± 2° | 30° ± 2° |
| 4. Laminating at 83 psi | 170 ± 2° | ~0 |
| 5. Laminating at 830 psi | 170 ± 2° | ~0 |
| 6. Laminating at 3000 psi | 170 ± 2° | ~0 |
| 7. Laminating at 5000 psi | 170 ± 2° | ~0 |
| 8. Laminating at 8,000 psi | 149 ± 2° | 25° ± 2° |
| 9. Laminating at 13,000 psi | 135 ± 2° | Not slip |

As shown in FIG. 18 panels (a) and (b), the original untreated UHMWPE substrate in Sample 1 was relatively flat with striations from the extrusion process remaining on the surface. The surface became more highly structured after heating in Sample 2 as shown in FIG. 18, panels (c) and (d). The recrystallization of UHMWPE occurred under these conditions, forming micro bumps on the order of 100 microns as shown in these figures. Static water contact angles on Samples 1 and 2 were 105±2° and 123±2°, respectively. The higher static water contact angle for the heat treated surface was consistent with increased roughness based on the Wenzel equation known in the art. As shown in Table 3, small water droplets could not slip off the surface of either Sample 1 or 2. Thus, no superhydrophobicity was observed for these two samples and their surfaces could be fully wetted.

In Sample 3, a layer of hydrophobic silica nanoparticles (TS 530, Cabot Corporation) was used to cover the polymer substrate and the assembly was heated using the same conditions as those used in treating the neat UHMWPE substrate in Sample 2. As shown in FIG. 18 panels (e) and (f), the nanoparticles decorated the polymer substrate after heating. A surface structure similar to the uncoated polymer was observed, however nanoparticles created an additional fine-scale roughness. Indeed, the underlying polymer micro-texture was revealed by removing the nanoparticles by etching in a 49% HF for 8 hours. As shown in FIG. 18 panels (g) and (h), UHMWPE not coated with nanoparticles showed a similar micro-texture to that observed in the UHMWPE not coated with nanoparticles (comparing IG. 18 panels (c) with 11(g)), while the presence of nanoparticles created a layer of fine-scale roughness (comparing FIG. 18 panels (d) and (h)). Thus, even without applied pressure, percolative infiltration of UHMW PE into nanoparticles could be observed. As a result, Sample 3 exhibited superhydrophobicity as evidenced by a water contact angle of 153±2°, but some wetting could occur in Sample 3 as small water droplets could not slip off the surface.

To further investigate the effect of process conditions of the percolative infiltration of UHMWPE into nanoparticles for the control of hierarchical surface structures, pressure was applied during heating. SEM images of samples made under different pressures are shown in FIGS. 19 and 20. The same method of wet etching was applied to remove the nanoparticles after lamination so as to more clearly observe the underlying polymer structures. At a relatively low pressure of 83 psi, micro bumps (on the order of 100 microns) that formed during the recrystallization of UHMWPE could still be detected on the surface in Sample 4 (FIG. 19 panel (a)). However, any micro-cracks were effectively eliminated. After etching away the embedded nanoparticles, micro bumps on the order of 10 microns with fine nanostructures were revealed (as shown in FIG. 19, panels (b)-(d)). This nanostructure was far more extensive than that observed when no pressure is applied (as shown in FIG. 18 panels (g) and (h)), indicating the enhanced percolation length of UHMWPE under pressure. The surface in Sample 4 prepared at 83 psi exhibited excellent superhydrophobic properties with a contact angle of about 170° and a slip-off angle of about 0°. Water droplets less than 5 could not be placed onto the surface from a steel micro syringe tip, and larger water droplets could easily slip off the surface. Similar properties were observed for Sample 5 prepared at 830 psi.

As shown in Table 3, polymer sheets prepared by lamination at 83 psi, 830 psi, 3000 psi, and 5000 psi (i.e., in Samples 4-7) exhibited the best superhydrophobic properties among the nine samples. Without wishing to be bound by theory, it is believed that further increasing the lamination pressure could increase the extent of polymer percolation into the porous nanoparticle layer and could force the nanoparticles to be fully embedded into the polymer sheet, thereby reducing the roughness (e.g., the micro-texture at a scale of about 100 microns) generated by the nanoparticles on the surface of the polymer sheet. As a result, at higher lamination pressures, the superhydrophobic properties of the polymer sheets began to become adversely affected with a decrease in the contact angle and an increase in the slip-off angle as shown in Table 3. Specifically, when the lamination pressure was increased to 8,000 psi, solid blocky structures were formed on the surface of the polymer sheet in Sample 8 as shown in FIG. 20 panel (a). After removing the silica particles by etching with hydrofluoric acid, a relatively flat surface with fine pore structures were detected. See FIG. 20 panels (b)-(d). Although these surfaces exhibited hierarchical structures with a sub-micron scale roughness, they did not exhibit superhydrophobicity. As shown in Table 3, the water contact angles of the surface of the polymer sheets in Samples 8 and 9 were lower than 150° and water droplets could not readily slip off the surfaces of these two samples.

The above characterization study demonstrated that the percolative infiltration of polymer into porous nanoparticles can produce superhydrophobic surfaces by creating a multi-level, hierarchical roughness layer on the surface of the polymer. Without wishing to be bound by theory, the levels of roughness could arise from the nanoparticles and nanoparticle agglomerates (e.g., having a length scale of 20-200 nm) to nanoparticle coated polymer filaments formed during the percolative infiltration process (e.g., having a length scale of 1-10 microns) and polymer micro-textures (micro-moguls) formed during relaxation and recrystallization of the polymer substrate (e.g., having a size about 100 microns). Moreover, the process conditions could have a significant effect upon the microstructure and thus the wetting properties of the surface.

Example 3

Dynamic Water Pressure Resistance Test

A superhydrophobic polymer sheet was prepared using low density polyethylene (approximately 10 layers where each layer was 0.005" thick). The polymer sheet was placed on a steel plate and put into a press. The polymer sheet was then heated at 123° C. under a pressure of approximately 30 psi to form a polymer sheet approximately 1 mm thick. This polymer sheet was subsequently cooled. A layer of silane treated silica nanoparticles (Cabot TS-530) was placed on a piece of paper to make a uniform layer approximately 100 microns thick. The particle coated paper was placed on a lower steel plate. After the 1 mm polymer sheet was placed on the particles, an upper steel plate was placed on top of the polymer sheet. The entire stack-up was placed into a press and heated at 123° C. at ~30 psi for ~20 minutes. The press was then opened and the sample was allowed to cool to room temperature.

Water droplets (5 mm diameter) were released from a height of 8.5 meters onto a free-standing superhydrophobic film and the impact was recorded using a Phantom high speed camera from Vision Research at a frame rate of 20,000 frames/second. Impact velocity was estimated at 8.8 m/second based on the height and by tracking the droplet within individual video frames. The drop hit the surface, spread significantly then broke apart into numerous smaller droplets. The surface was not wetted by the drop and remained superhydrophobic after multiple impacts. In addition, pumping water onto the surface at a rate of 100 gallons/hour for 45 hours did not significantly degrade the surface properties. Similarly, the superhydrophobic properties were retained when the polymer sheets were ultrasonicated for 30 minutes in water.

Example 4

Test of a Superhydrophobic Surface Against Super-Cooled Water Droplets

Silica nanoparticles (Cabot TS-530) were dispersed in a solution of methanol and stirred. The solution was then dried at 150° C. and the particles were placed in the bottom of a steel plate with sidewalls to retain the particles. The thickness of this layer was approximately 3 mm. After a HDPE sheet having a thickness of approximately 0.01 inch was placed on the particles, a flat steel plate was placed on top of the polymer sheet. The stack-up was then laminated at 138° C. at a pressure of 300 psi for 30 minutes. The sample was removed from the press and allowed to cool to room temperature. The polymer was then removed from the nanoparticle layer and washed to remove any excess or loose particles.

The ability of the superhydrophobic surfaces of the polymer sheet described above to repel super-cooled water droplets was demonstrated using liquid water droplets 13 microliters in volume (3 mm in diameter) cooled to −5.1° C. A portion of the polymer sheet having a superhydrophobic surface prepared above was mounted onto a sloped aluminum block at a 20° angle relative to a horizontal surface. The temperature of the surface was controlled with a closed-loop refrigeration system capable of cooling the aluminum block to a temperature as low as −70° C. Deionized water in a 10 cc syringe with a stainless steel syringe tip was cooled to −5.1° C. using a Neslab chiller and kept at that temperature for 1 hour before use. Once the surface of the aluminum block was cooled to an appropriate temperature, the syringe was removed from the chiller, mounted at a location 11 cm above the surface, and the super-cooled droplets were allow to impinge upon the cooled surface. When the surface was cooled to temperatures as low as −32° C., a supercooled droplet would bounce off the surface without forming ice. By contrast, when an unprocessed polyethylene sheet was used, the super-cooled droplets froze onto the surface and ice began to accrete immediately after the droplet impinged on the surface.

The experimental results showed that the ability of a superhydrophobic surface to mitigate ice accumulation depended upon the temperature of the surface. Specifically, when the superhydrophobic surface was cooled to temperatures above −13° C., all super-cooled droplets were repelled and no ice was formed on the surface. At lower surface temperatures, however, ice began to accumulate after a certain number of droplets impacted the surface. When the surface was maintained at −32° C., the first 5 drops could bounce off the surface before ice began to accumulate, Below −40° C., all supercooled droplets froze upon impact. In addition, the results showed that the icephobic properties of a superhydrophobic surface also depended upon droplet size. Ice formation began at higher temperatures when 50 microliters (about 5 mm diameter) droplets were used. Since the average super-cooled water droplet in the atmosphere is below 0.5 mm, ice accumulation is not expected to occur if the surfaces are maintained at normal atmospheric temperatures (e.g., above −32° C.). At these temperatures, superhydrophobic surfaces described herein would be especially resistant to ice accumulation.

Example 5

Test of a Superhydrophobic Surface Against Ice Accumulation

A superhydrophobic polymer film was made by laminating LDPE against a layer of nanoparticles (TS530) with a thickness of about 100 micrometers at 123° C. under a pressure of about 30 psi for 1 hour using the same process described in Example 3 except that a metal mat is placed between the lower plate of the press and the steel plate supporting the sheet of nanoparticles. The mat was used to distribute the pressure more uniformly, as is commonly done in plate lamination processing. A longer heating time was used as the mat impedes the conduction of heat from the plate to the polymer sheet. To test the icephobic properties of the superhydrophobic polymer film described above when exposed to small super-cooled liquid water droplets of average size (5-40 micrometers), the free-standing polymer film was placed on the windshield of a parked car overnight during an ice storm with its superhydrophobic surface exposing to air. Ice accumulated on all exposed surface of the windshield that was not covered by the polymer film. Although some ice did coat a portion of the polymer film, especially the edges, the central portion of the film remained ice-free. By contrast, a film made from untreated polyethylene that was also placed on the windshield was difficult to see as it became encrusted in ice.

Example 6

Fabricating Polymer Sheets Having a Superhydrophobic Surface by Using a Template Coated with a Porous Nanoparticle Layer In this example, a template was coated with dry particles before a polymer sheet was laid atop the template. A commercially available thermoplastic sheet of low density polyethylene (LDPE) manufactured by Berry Plastics (Evansville, FN) and sold through McMaster-Carr was used as the polymer sheet. The polymer sheet contained 97% recycled polyethylene, 2% calcium carbonate and 1% slip oleamide. A nylon mesh with a pore diameter of 40 micrometers and a wire width of 40 micrometers was coated with silane treated nanoparticles (TS530, Cabot Corporation). During the coating treatment, the pores of templates were partially filled with the nanoparticles. The lamination of the polymer sheet with the template coated with nanoparticles was conducted at 123° C. under a pressure of 200 psi for 20 minutes. The cooling and peeling steps were the same as the procedures in Example 1.

The nanoparticles coated on the template generated rough nanostructures on the polymer posts after lamination resulting in surfaces which exhibited improved superhydrophobic properties, such as increased stability towards impinging water droplets compared to samples made in Example 1. By incorporating the nanoparticles, the static water contact angle of the fabricated surface increased from 160° to 165° and the slip-off angle of water droplets decreased down to 3°. Without wishing to be bound by theory, it is believed that surfaces prepared from nanoparticle-coated templates have three levels of roughness. Two roughness levels are similar to those surfaces made in Example 1, albeit less well defined, and correspond to the pores in the template and the filaments used to weave the template. A third level of nano-roughness is added upon these features from the nanoparticles. The nanoparticles were either incorporated into the polymer surface, or create grooves into the surface during the lamination-peel process.

Quantitative testing demonstrated that the superhydrophobicity of the surface prepared above remained unchanged after washing numerous times with a saturated soap solution made with a soap powder (ALCONOX—Powdered Precision Cleaner, from VWR International, containing 7-13% sodium carbonate, 10-30% sodium dodecylbenzenesulfonate, 10-30% tetrasodium pyrophosphate, and 10-30% sodium phosphate) or ultrasonication in the same solution for 5 hours. The results showed that the superhydrophobicity of the fabricated surface possessed good stability under high water pressures. Static pressure tests demonstrated that the superhydrophobic surface remained dry even under a water pressure of 8 psi (5.6 m water) for more than 5 hours, showing a significantly greater water pressure resistance than that of a lotus leaf.

Example 7

Fabricating Polymer Sheets Having a Superhydrophobic Surface by Using a Template Coated with a Porous Nanoparticle Layer and a Polymer Sheet Coated with a Layer of Porous Nanoparticle Layer The same Ultra-high-molecular-weight polyethylene (UHMWPE, McMaster Carr, Elmhurst, Ill.) used in Example 2 was used as the polymer sheet. A steel mesh with a pore size of 309 micrometers and a wire diameter of 114 micrometers was used as the template. First, a thixotropic solution was prepared by dispersing silane-treated hydrophobic nanoparticles (e.g. TS-530 from Cabot Corporation) into an appropriate solvent (e.g. a mixture of 30 wt % water and 70 wt % methanol). Subsequently, the polymer sheet and the mesh template were coated with the prepared solution and dried at 150° C. for 10 minutes. The thickness of the nanoparticles on the polymer sheet was around 150 micrometers. The coated mesh and the coated polymer sheet were placed between two flat stainless steel plates. The assembly was then laminated at 200° C. and under a pressure of 800 psi for 2 hours. During lamination, the polymer melted and infiltrated the pores between nanoparticles coated on the polymer. With reduced viscosity, the polymer penetrated into the pores of the template, forming micron sized patterns (0.5 to 10 microns) on the surface of the polymer sheet. As the polymer cooled, a micro-textured roughness is formed to which particles strongly adhered.

The fabricated UHMW PE superhydrophobic surface exhibited excellent water repellency. The static water contact angle was higher than 170° and the slip-off angle of 10 microliters water droplets was just above 0°. The polymer surface maintained its superhydrophobicity with a water contact angle of 155° after 100,000 abrasion cycles under a pressure of 32 kPa using the mechanized abrasion test described in Example 1. Moreover, the superhydrophobic surface exhibited excellent scratch resistance. Specifically, water droplets maintained a contact angle higher than 160° after the surface was scratched 50 times using a sharp steel nail.

Example 8

Superhydrophobic Polymer Composite Materials with Self-Cleaning Properties and Photo-Induced Wetting and Dewetting Properties A commercially available thermoplastic sheet of high density polyethylene (HDPE) from McMaster-Carr was used as the polymer substrate. A precision woven nylon mesh (371×371, from McMaster-Carr) was used as the template to create microstructures on the polymer surface. The wire diameter and the pore size of the nylon mesh were 33 micrometers and 36 micrometers, respectively. $TiO_2$ nano particles (from Sigma-Aldrich) with a size ranging from 20-100 nm were used to create nanostructures on the polymer surface. According to the supplier, the phase of the $TiO_2$ particles was a mixture of rutile and anatase. The hybrid photocatalytic-superhydrophobic surfaces were fabricated using Method 3 described above. The thickness of the TiO2 particles layer was about 100 micrometers, and the thickness of the HDPE polymer sheet was 0.03 inch. The stack-up was heated up to 138° C. under a pressure of 4000 psi for 30 min. In the second step, the mesh template is separated from the polymer film. The laminated stack was cooled to room temperature (25° C.) and then the mesh was separated from the polymer surface. The fabricated superhydrophobic surface is formed and exposed during the peeling process.

The fabricated superhydrophobic surfaces were mounted on a movable stage driven by a motor at a speed of 1 mm·per sec. The tilt angle of the surface was fixed at 13°. Water droplets were pumped out using a syringe pump (from KD Scientific Syringe Pump Company) at speeds ranging from 1-8 microliters per·sec. The distance between the surface and tip was adjusted from 5-100 mm. Both coarse $Al_2O_3$ grit with a size ranging from 50-130 micrometers and fine carbon powders with an average size of 1 micrometers were used as test contaminates. The self-cleaning process was recorded by a high speed camera (EX-FH25, Casio) at 120 frames per second.

UV light was generated by a UV spot lamp (Bluewave 200, Dymax). The wave length of the UV light ranged from 320 nm to 450 nm with a peak of 365 nm. The change of the CA with the UV illumination time was monitored. The surface after UV illumination was heated at 105° C. for 1.5 h for recovery.

The thermal properties of the HDPE were tested by Differential scanning calorimeter (DSC). The surface structures were studied by field emission scanning electron microscopy (FESEM, Amary) and optical microscopy (Nikon-SMZ 1500 and Laborlux-12ME). The static CAs and slip-off angle were measured with a goniometer (250-F1, Rame-Hart Instruments Co). Droplets of distilled water, with a volume of about 5 microliters, were placed gently onto the surface at room temperature and pressure. The static CA, advancing and receding CAs were measured five times at different locations such that the measurement variance was ±2°. The slip-off angle was measured by placing water droplets of about 10 microliters on an initially horizontally substrate and then tilting the substrate until the water droplet rolled off the surface. The distribution of $TiO_2$ particles on the fabricated surfaces were detected by energy-dispersive X-ray spectroscopy (EDX) at a scanning voltage of 10 KV.

Figure 21:
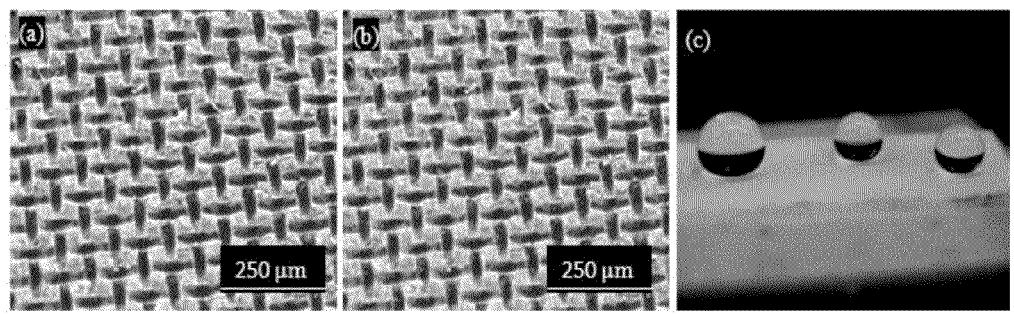
FIG. 21 illustrates three images (a-c) of an exemplary surface.

The surface structure is shown in FIG. 21. The raised areas were created when the polymer flowed into the pores of the mesh. The recessed areas were formed as the wires of the mesh were forced into the polymer substrate. The pitch of the posts structures is about 65 micrometers. To investigate the concentration of the $TiO_2$ nanoparticles and their distribution on the surface, the technique of energy-dispersive X-ray spectroscopy (EDX) was used for directly mapping the nano $TiO_2$ particles on the surface. The surface was coated with carbon to improve the conductivity of the surface for imaging. As shown in FIG. 21, panel b, the nano TiO2 particles are mainly dispersed on the posts, and a very few of $TiO_2$ particles can be detected at the bottom grooves surrounding the posts. Although the surface was pre-coated with carbon for imaging, the detected weight ratio of Ti element to C element is about 37:53, indicating a high concentration of nano $TiO_2$ particles on the posts. It is estimated that the nano $TiO_2$ particles covered about 20% area of the top surface of each post. As shown in FIG. 21, panel c, water droplets with different volumes beads up on the surface, forming a sphere shape, indicating an excellent superhydrophobicity.

Figure 22:
FIG. 22 is an image of an exemplary surface.

The self-cleaning effect of the fabricated hydrophobic-hydrophilic surface was demonstrated using two types of test contaminant particles: coarse $Al_2O_3$ grit with a size ranging from 50-130 micrometers and fine carbon powders with an average size of 1 micrometers. As shown in FIG. 22, the black carbon particles were absorbed into water droplets as the droplets rolled along the tilted substrate. As the substrate was translated across the syringe pump outlet, the carbon particles were removed and the surface was cleaned. This result demonstrated that the hydrophilicity of the $TiO_2$ particles did not impede the self-cleaning effect when using water to remove inorganic particles. The self-cleaning effect on a superhydrophobic surface mainly depends on the ability of water droplets to roll easily across the surface and not be bound to the surface where the droplets could evaporate, concentrating the particles. Before this experiment was conducted, the hydrophilic regions could have been expected to contribute a force for binding the water to the solid surface. However, this did not occur to any significant extent, and so the self-cleaning effect was observed.

One unique feature of this hydrophilic-hydrophobic patterned nanocomposite surface is that it exhibits reversible wettability. After the surface is fabricated, the surface exhibits good superhydrophobic properties. However, upon exposure to UV light, the superhydrophobic properties are degraded and eventually lost, depending upon UV does. Superhydrophobicity was restored after heating the surface at 105° C. for 1.5 hours as shown in FIG. 10. The original water CA of the fabricated surface was measured to be 158°; after UV illumination at a powder density of 50 mW per square cm for 30 min with water introduced on the surface, the CA was reduced 120°. The decrease of the CA is caused by the photo induced hydrolysis of the $TiO_2$ nanoparticle surface. The basic photochemical reactions on $TiO_2$ are outlined in equations 1-4. Electrons ($e^-$) and positive holes ($h^+$) are generated on the surfaces under UV illumination. Water molecules absorbed by the solid surface or from the surrounding air would react with the positive holes, and the oxygen molecules could react with the electrons. Both of the two reactions greatly contribute to enhancing the hydrophilicity of the photocatalyst surface by facilitating the hydrolysis of the $TiO_2$ surface. The ions and radicals formed in the presence of $TiO_2$ are capable of oxidizing organic compounds as well as deactivating plants and organisms. The schematics of the changes of hydroxyl groups on $TiO_2$ film under UV light irradiation and in the dark is shown below.

$$TiO_2 + h\nu \longrightarrow TiO_2 (h^+ + e^-) \quad (1)$$

$$TiO_2(h^+) + H_2O \longrightarrow TiO_2 + OH\cdot + H^+ \quad (2)$$

$$TiO_2(e^-) + O_2 \longrightarrow TiO_2 + O_2^- \quad (3)$$

$$O_2^- + H^+ \longrightarrow HO_2\cdot \quad (4)$$

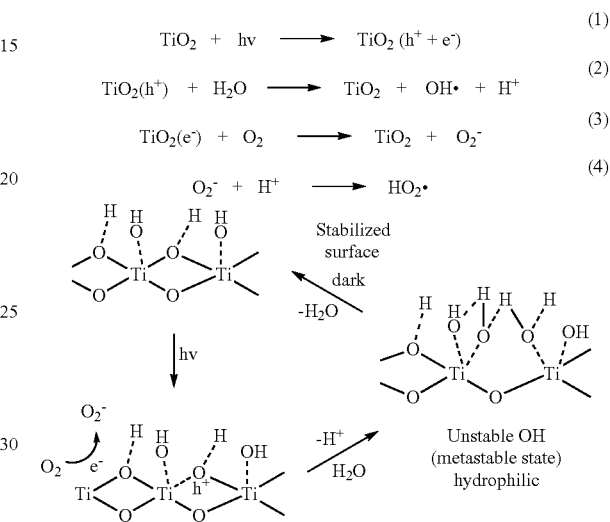

Figure 23:
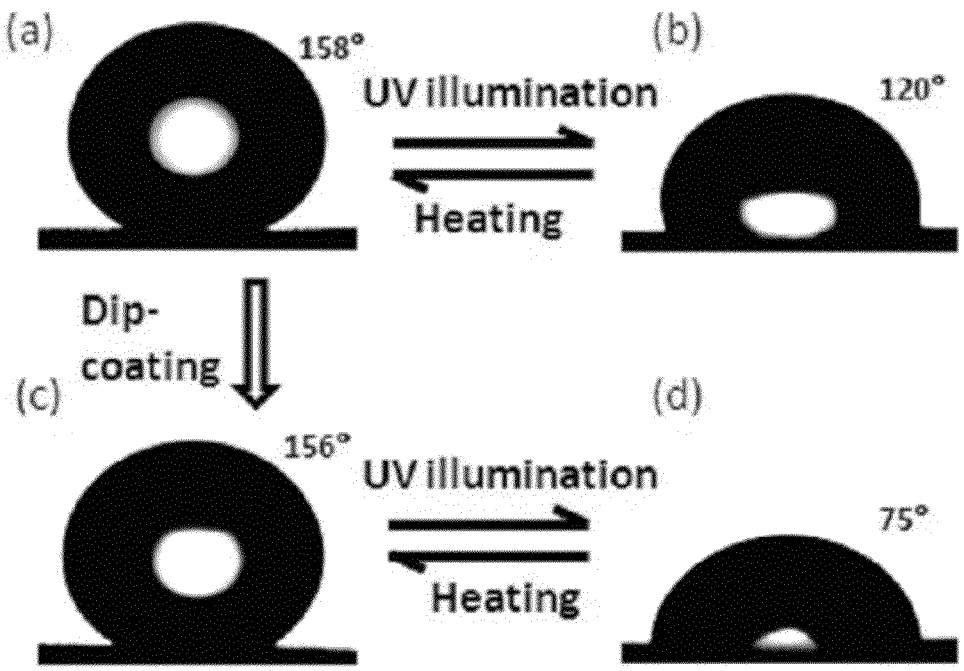
Figure 24:
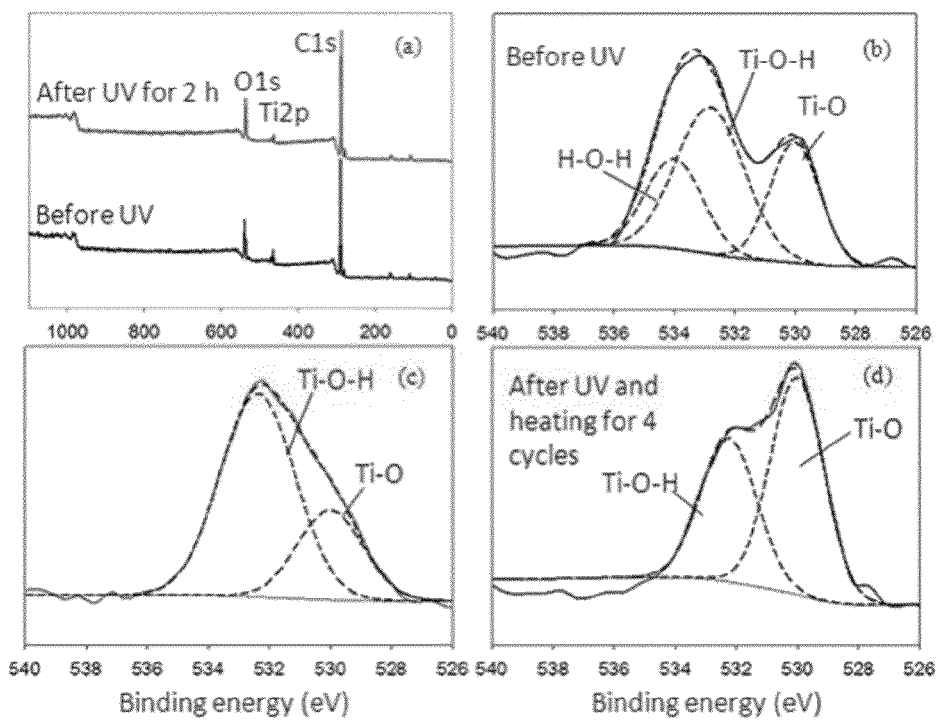
FIG. 24 provide XPS data concerning this alternation.

In order to enhance the wetting state under UV illumination, additional $TiO_2$ nano particles were coated onto the surface by dip-coating using a methanol solution containing 2.5% nano $TiO_2$ particles. The surface was immersed 5 times followed by drying in room temperature for about 2 minutes after each immersion. After this treatment, a slight decreased of the contact angle from 158° to 156° was observed on the as-prepared surface (FIG. 23, panels a and c). After UV illumination on this surface, the contact angle decreased to 75°. The superhydrophobicity could be restored by heating at 105° C. for 1.5 h. The reversible wetting properties are due to the reversible hydrolysis of the $TiO_2$ particle surface as shown by XPS results in FIG. 24. The hydrolyzed surface is more hydrophilic whereas the surface becomes dehydrated, and more hydrophobic, after baking in an oven at 105° C.

Example 2

Hybrid Superhydrophobic Polymer Composite Materials with Enhanced Photocatalytic Properties for Self-Cleaning and Water Droplet Purification A hybrid photocatalytic-superhydrophobic surface was fabricated using Method 1 described above. An industrial ultra-high molecular weight polyethylene (UHMW PE) from McMaster-Carr with a thickness of 0.8 mm and a melt point of about 130° C. was used. $SiO_2$ nanoparticles (Cabot TS-530) with an average agglomerate particle size of 200-300 nm were dispersed in a mix solution of 70% methanol and 30% water, and the concentration of the $SiO_2$ was adjusted to be about 5%. The concentration of $SiO_2$ particles was 5%. $TiO_2$ nanoparticles (Evonik, P90) with an average diameter of about 14 nm was used as photocatalyst. A steel mesh with a pore size of 309 micrometer and a wire diameter of 114 micrometer was coated with the silica particle dispersion. The silica particles were coated onto the UHMWPE sheet using a Doctor Blade with a gap of 0.006" and dried at 60° C. for 10 min. After assembly of the stack-up, lamination was performed at 200° C. and 800 psi for 120 min. After lamination, excess silica particles were removed and the UHMWPE nanocomposite (with embedded mesh still in place) was laminated against a layer of $TiO_2$ nanoparticles to fabricate a superhydrophobic surface with isolated photocatalyst regions. The $TiO_2$ layer was made by Doctor Blade and the thickness was controlled to be 200 micrometers. The assembly was laminated again at 200° C. and 800 psi for 120 min. The sample was cooled to room temperature under pressure, and the mesh was peeled off to expose the fabricated surface.

Figure 25:
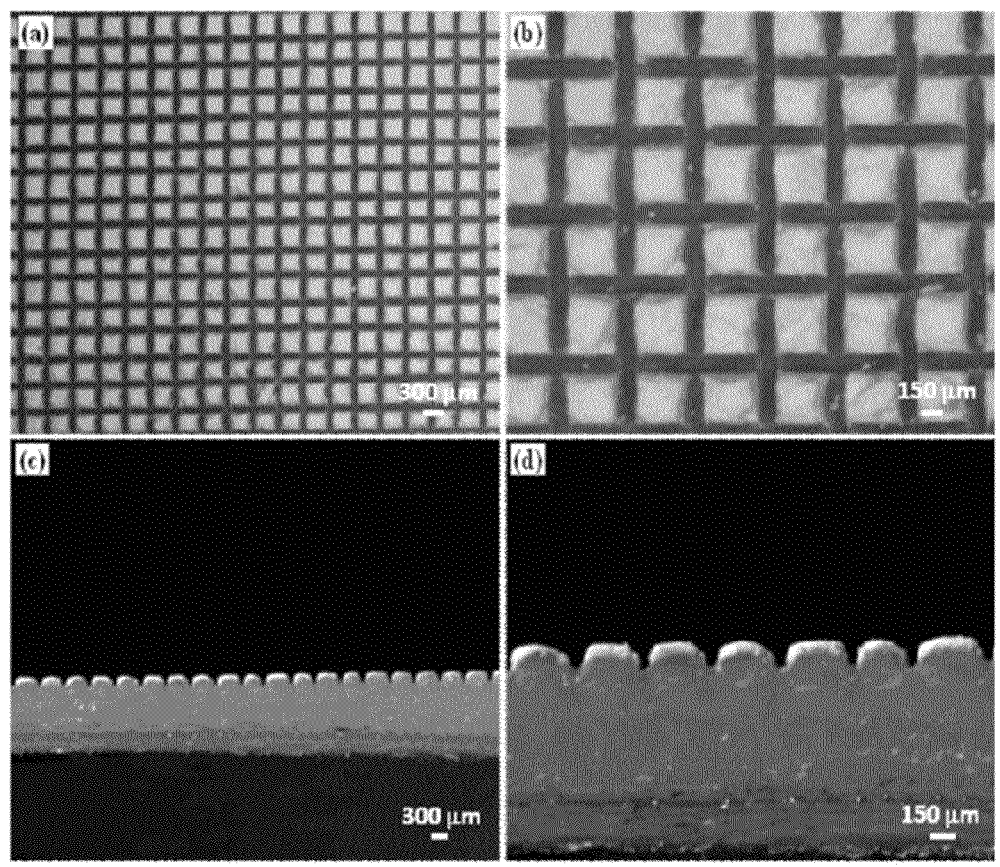
FIG. 25 are micrographs of an exemplary fabricated surface.

Micrographs of the fabricated surface are shown in FIG. 25. It can be seen that the mesh template was embossed into the polymer surface creating a negative image of the wire mesh. In this case, the mesh template was used for embossing (creating the primary roughness). During the embossing step, the polymer infiltrated into pores between nanoparticles causing the nanoparticles to adhere to the polymer, both along the groove surfaces as well as the raised areas formed in the pores of the mesh (isolated regions between the grooves). This process created a secondary, fine-pitch roughness.

In the second lamination step, the polymer could infiltrate into the pores between $TiO_2$ nanoparticles, but only in the raised regions (i.e. the pores in the wire mesh) forming isolated photocatalyst regions. The embedded mesh acts as a mask, preventing $TiO_2$ particles from adhering into the grooved regions. During lamination, the polymer adheres strongly to the nanoparticles at the surface. The $SiO_2$ particles present in the raised regions from the $1^{st}$ lamination step, remain, but may become more deeply embedded below the surface. After the second lamination step the mesh is removed to produce the final surface.

Figure 26:
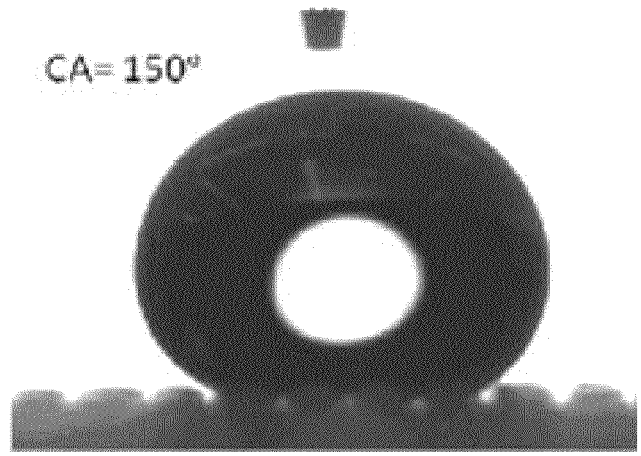

The $TiO_2$ regions are clearly visible and appear white in FIG. 25. The water contact angle of this surface is shown in FIG. 26. The white points under the water droplet demonstrate that air is trapped under the water droplets, thus the water droplets are maintained in Cassie state. The superhydrophobic groove is helpful for preventing the transition from Cassie state to Wenzel state. This transition would cause the droplet to adhere to the surface and form a static boundary layer of fluid. Thus the water droplet is movable on such a superhydrophobic surface even though the droplet can wet the catalytic region. Varying the dimensions of the mesh will change the relative area fraction of $SiO_2$ superhydrophobic grooves to raised $TiO_2$ hydrophilic-photocatalytic regions. A larger area fraction of $TiO_2$ regions will increase overall catalytic activity, but decrease drop mobility.

The ability of the fabricated surface to photooxidize organic contaminants in water was tested using an aqueous solution of Rhodamine B dye. Dyes are recognized as industrial pollutants that are especially difficult to remove using conventional wastewater treatment technologies due to their low molecular weight and high water solubility. In addition, the photooxidation of dyes is straightforward to measure using UV-visible spectroscopy. The UV-Vis spectra of 1.5 mL droplets of dye solution were measured as a function of surface composition, UV exposure time and droplet motion as shown in the UV spectra. For all experiments, a droplet (1.5 mL) of a Rhodamine B solution (13 mg/L Rh B) was used as the probe fluid and exposed to a broad spectrum UV light source (Dymax Bluewave 200 lamp connected via a 5 mm diameter liquid waveguide). The surface was irradiated with a total power of 50 mw per square cm. On a superhydrophobic surface composed of only $SiO_2$ (no $TiO_2$ particles) a droplet of dye solution exhibits no significant degradation after 2 hours as shown in FIG. 15a. However, when the dye containing droplet was placed on a hybrid superhydrophobic surface composed of $TiO_2$ particles as prepared by Method 1 and described above, the dye molecules are mostly decomposed in 3 hours as shown in the UV spectra. In this case the droplet remained in the same position throughout the UV exposure. This demonstrates that the as-prepared catalytic superhydrophobic surface exhibits significant catalytic activity. This type of surface would be useful for many water purification applications and is unique in its ability to immobilize commercially available $TiO_2$ particles on a surface while maintaining their catalytic activity.

Figure 27:
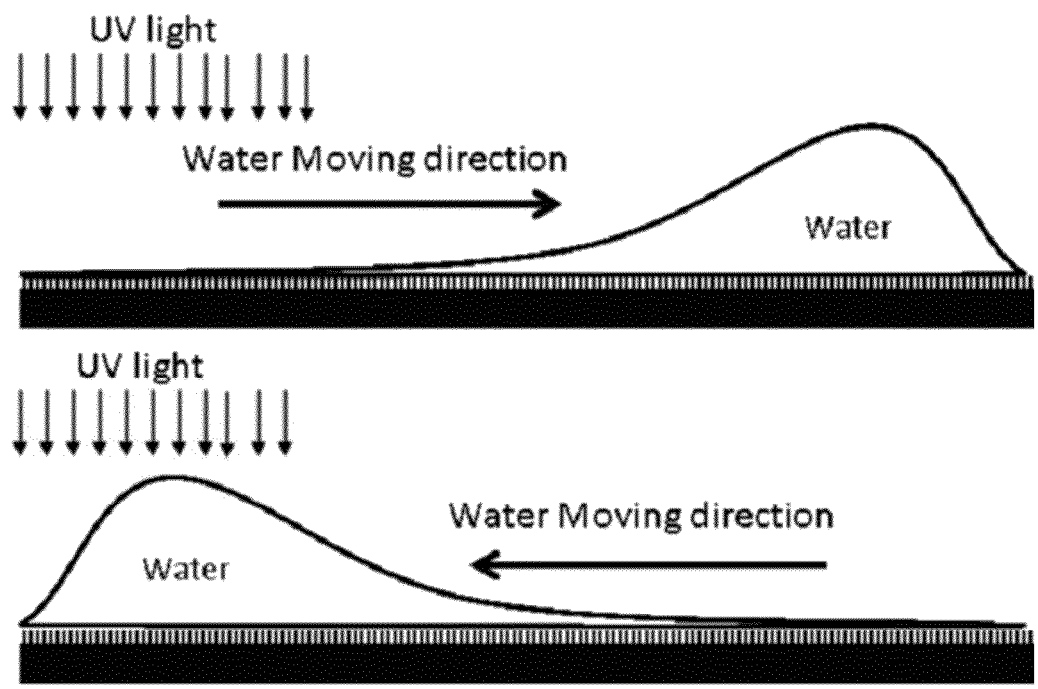
FIG. 27 depicts water movement on an exemplary surface.

To further increase the photooxidation rate, the droplet was made to move back and forth under UV illumination by mounting the substrate onto the table of a Taber Reciprocating abraser machine. As the table moved back and forth, the droplet moved back and forth across the surface while the light source remained fixed. Walls of a superhydrophobic material where placed around the substrate to allow the drop to bounce off the walls at the end of each cycle without adhering to them. Because the drop became pinned in the $TiO_2$ catalyst regions, the drop did not completely roll freely across the surface, but moved in an oscillatory fashion as shown in FIG. 27. Similar to rolling along a superhydrophobic surface, this technique allowed the drop to leave behind a thin layer of solution that could be rapidly photooxidized. In no case did the dye containing solution wet into the $SiO_2$ grooves. These regions remained superhydrophobic throughout the experiment. We anticipate that by adjusting the relative areas of raised $TiO_2$ to grooved $SiO_2$ regions, higher drop mobility can be achieved.

Figure 28:
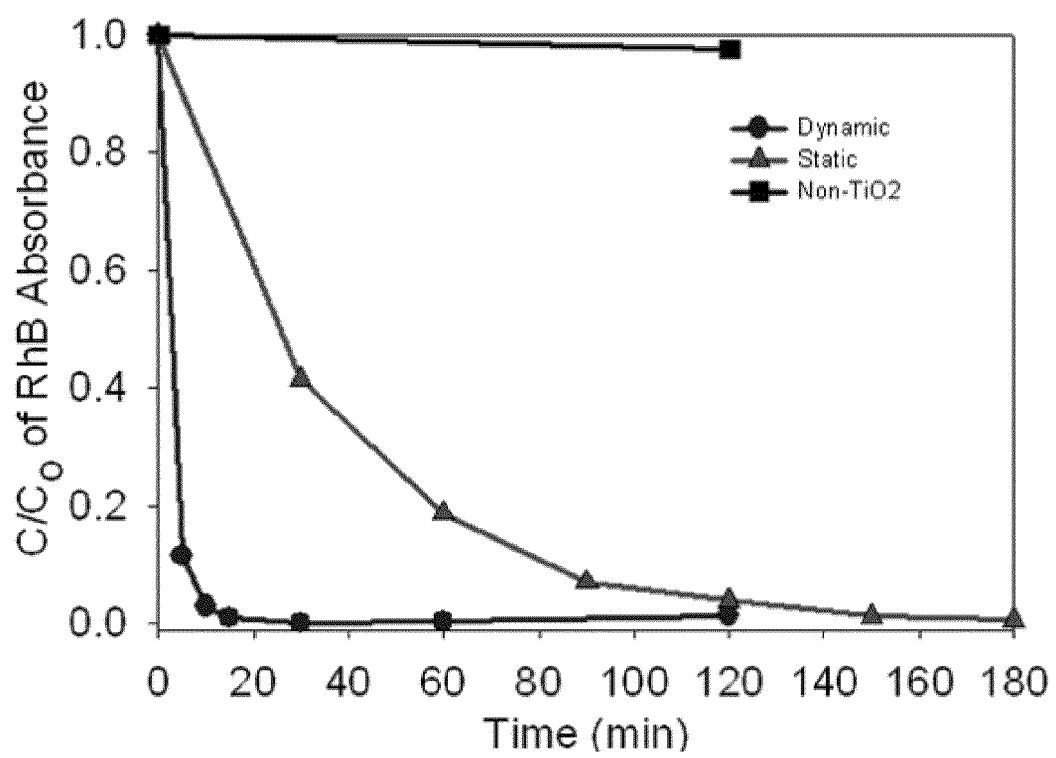
FIG. 28 is a graph comparing photoxidation rates.

In this arrangement, the degradation efficiency of the surface was dramatically improved. The dye was completely photooxidized after 0.5 hours, less than one-sixth the time required to photooxidize the dye in a static drop. Photooxidation rates for the three cases are compared in FIG. 28. These results clearly demonstrate the advantage of the disclosed hybrid superhydrophobic-photocatalytic surface technology. It is interesting to note that the drop was illuminated for only about half the time in the dynamic experiment as compared to the static drop experiment. Although the exposure time was reduced by 50%, the degradation rate was significantly enhanced.

Example 3

Photocatalytic Polymer Composite Materials for Waste Water Purification and Drinking Water Disinfection This example is intended to illustrate how such a material could be used for the photo-oxidation of an organic dye for water purification.

An industrial ultra-high molecular weight polyethylene (UHMW PE) from McMaster-Carr with a thickness of 0.02 inch and a melt point of about 130° C., a layer of $TiO_2$ nanoparticles (P90, from Evonik) with a thickness of about 14 nm and two smooth caul plate are assembled and laminated at 500 psi, 310 F for 30 min using the lamination process described in our previous invention (FIG. 2, Lyons, A. M. and Xu, Q. F. Polymers Having Superhydrophobic Surface, 27541-0062WO1, filing date Feb. 2, 2012). After lamination, excess $TiO_2$ nanoparticles were removed by rinsing with tap water and blow the surface dry with compressed air. No mesh was used to create large scale roughness.

Figure 29A:
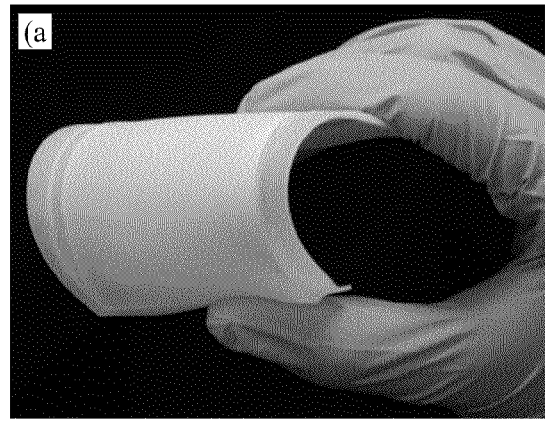
FIGS. 29A, 29B and 29C illustrate macro structures and microstructures of a fabricated surface.
Figure 29B:
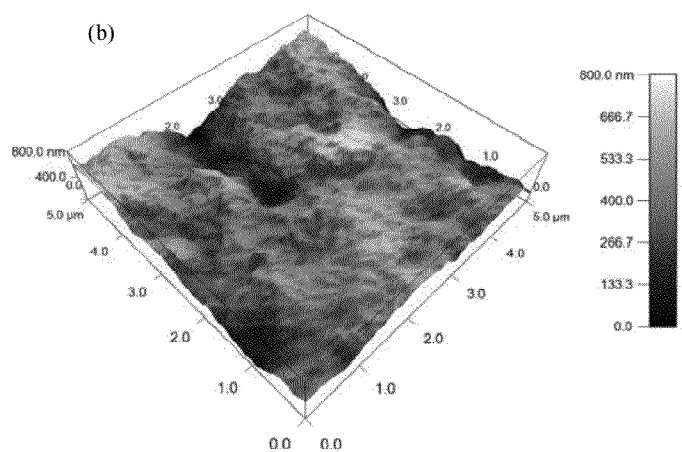
Figure 29C:
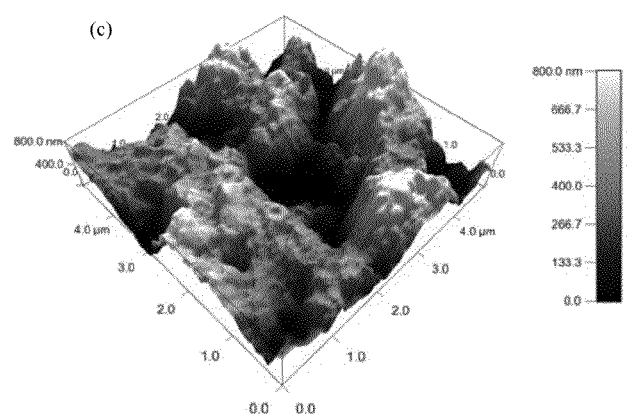

An optical image and AFM images showing the three-dimensional Micrographs of the fabricated surface are shown in FIG. 29A-29C. From FIG. 29A, it can be seen that the film is highly flexible and the fabricated polymer-$TiO_2$ nano composite film can be bent or rolled without damage. The flexibility of this robust film makes it suitable for constructing portable photocatalytic reactors, such as a photocatalytic plastic bag.

The 3D microstructures of the as-prepared surface and the interface between the $TiO_2$ particles and the polymer substrate have been imaged using AFM using a high resolution Z (height) mode as shown in FIG. 29B and FIG. 29C. The top layer of the as-prepared surface is shown in FIG. 29B. A micron-scale waviness to the surface can be seen, along with a fine scale, sub-micron roughness from the particles. After etching the $TiO_2$ particles using 49% HF acid for 24 h. the structure of the underlying polymer interface is revealed as shown in the AFM image in FIG. 29C. From FIGS. 29B and 29C, it can be seen that the film possess a very rough hierarchal structure on the micron and nanometer scales. The $TiO_2$ nanoparticles are tightly bound to the surface and so form a stable polymer-$TiO_2$ nano composite film. Combining the high surface area of the nanoparticles with the hierarchical roughness of the polymer-nanoparticle surface creates an overall $TiO_2$ surface area which is significantly larger than the projected surface area of the substrate. This increased surface area is beneficial for achieving high photodegradation efficiency for both organic pollutants as well as pathogenic microorganisms. In addition, because the surface of the $TiO_2$ particles on the film is not contaminated or covered by any organic chains or groups, the activity of the immobilized particles is significantly greater than that found in conventional polymer-$TiO_2$ nanoparticle composites. Enhanced photodegradation efficiency and durability can be expected according to the hierarchical micro-nano structure.

The fabricated surface was superhydrophobic immediately after the fabrication process and the water contact angle was measured to be 155°. This was because during the hot lamination process, most of the hydroxyl groups on the TiO2 nanoparticles were removed and the TiO2 particles exhibited their intrinsic contact angle, which is larger than 70°. Combined with the hierarchical roughness of the polymer nanoparticles composite, the surface exhibited superhydrophobicity. After immersion in water for 24 h, the surface became superhydrophilic.

Figure 30:
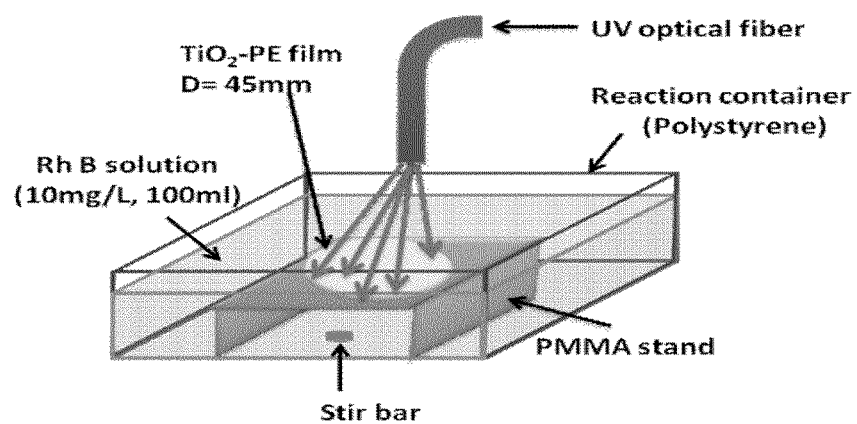
FIG. 30 is a depiction of an experimental setup for a photodegradation experiment.

The photodegradation evaluation experiment was conducted using a set-up as shown in FIG. 30. A solution of Rh B (100 mL) with a concentration of 10 mg per L was used to test the photodegradation efficiency of the $TiO_2$-polyethylene surface. The average power density of the UV light on the $TiO_2$-PE surface was measured to be 12 mW per square cm using a UV intensity meter (ACCU-CAL 50), and the area of the TiO2-PE film was 16 square cm. A Perkin-Elmer UV-Vis spectrometer was used to analyze the degradation of the Rh B using the characteristic absorption peak at a wavelength of 554 nm. It can be seen from the photobleaching that most of the Rh B was decomposed by photocatalysis after 6 h of illumination under a UV source. According to this data, it is reasonable to deduce that when using a $TiO_2$-PE film with an area of 1 square m, more than 10 liters of water can be purified in 1 h under UV illumination at a moderate power density of 12 mW per square cm.

Example 4

Figure 31:
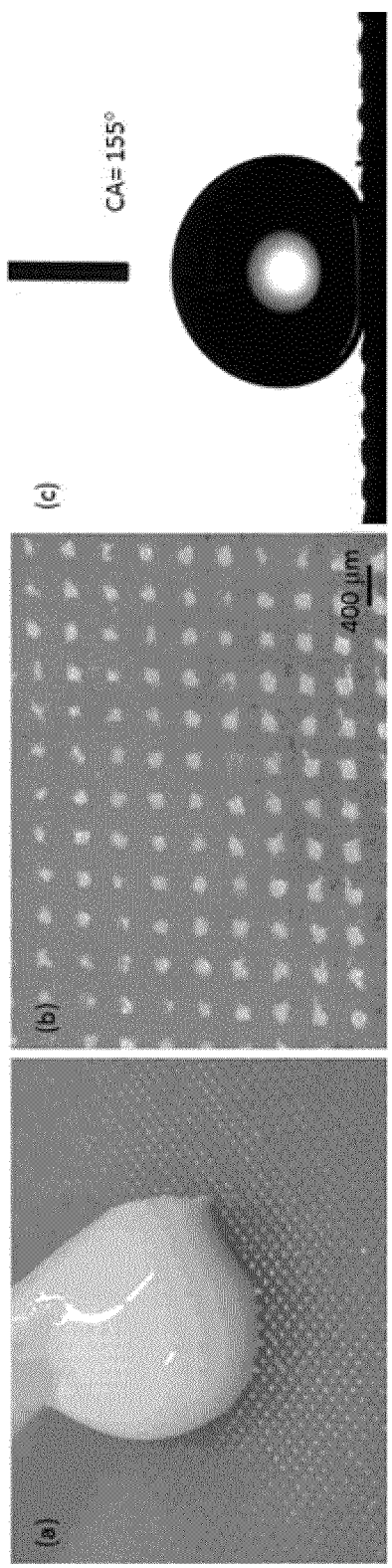
FIG. 31 provides three views of a surface exposed to water.

Hybrid Superhydrophobic Polymer Composite Material with Enhanced Photocatalytic Properties for Self-Cleaning and Water Droplet Purification An industrial ultra-high molecular weight polyethylene (UHMW PE) from McMaster-Carr with a thickness of 1/32 inch and a melt point of about 130° C. was used as polymer substrate. $SiO_2$ nanoparticles (Cabot TS-530) with an average agglomerate particle size of 200-300 nm were dispersed in a mix solution of 70% methanol and 30% water, and the concentration of the $SiO_2$ in the mixed solution was about 5%. The UHME PE sheet was coated with the $SiO_2$ solution using a Doctor Blade with a gap of 0.006". A steel mesh (60×60, from McMaster-Carr) was coated by wiping with the same 5% $SiO_2$ solution using a scraper. Both the treated polymer sheet and the mesh were dried in room temperature (25° C.) for 30 min. The coated polymer sheet and mesh, and the two smooth caul plates were then assembled according to FIG. 4, and laminated at a pressure of about 200 psi and 310 F for 1 h. After the lamination, excess silica particles were removed and the UHMWPE nanocomposite was treated in an $O_2$ plasma reactor with the embedded micromesh used as a solid mask. For safety, the metal mesh should be connected to ground. Otherwise, fire could be generated. After the plasma treatment, the mesh was separated from the polymer and the superhydrophilic-superhydrophobic hybrid pattern was fabricated. The self-assembly of $TiO_2$ nanoparticles (P25, from Evonik) was conducted by moving water droplets containing 20% of $TiO_2$ nanoparticles along the surfaces. Small water droplets were deposited onto the superhydrophilic dots as shown in FIG. 31, panel a. After drying, the $TiO_2$ nanoparticles were self-assembled onto the surface forming photocatalytic regions. Then the deposited $TiO_2$ nanoparticles were laminated again at 40 psi and 310 F for 30 min. The structure of the photocatalytic-superhydrophobic materials after second lamination is shown in FIG. 31, panel b.

Since the coarse features of this sample are relatively large, 10 microliter water droplets were used to measure the water CA. As shown in FIG. 31 panel c, the water CA on this sample can reach 155°. Water droplets can be moved easily under the influence of a syringe tip. Moreover, the impingement test showed that the water droplets could bounce off the surface completely, no wetting was observed. These results indicate that the manufactured hybrid sample maintains good superhydrophobicity for self-cleaning, in spite of the localized hydrophilicity.

Figure 32:
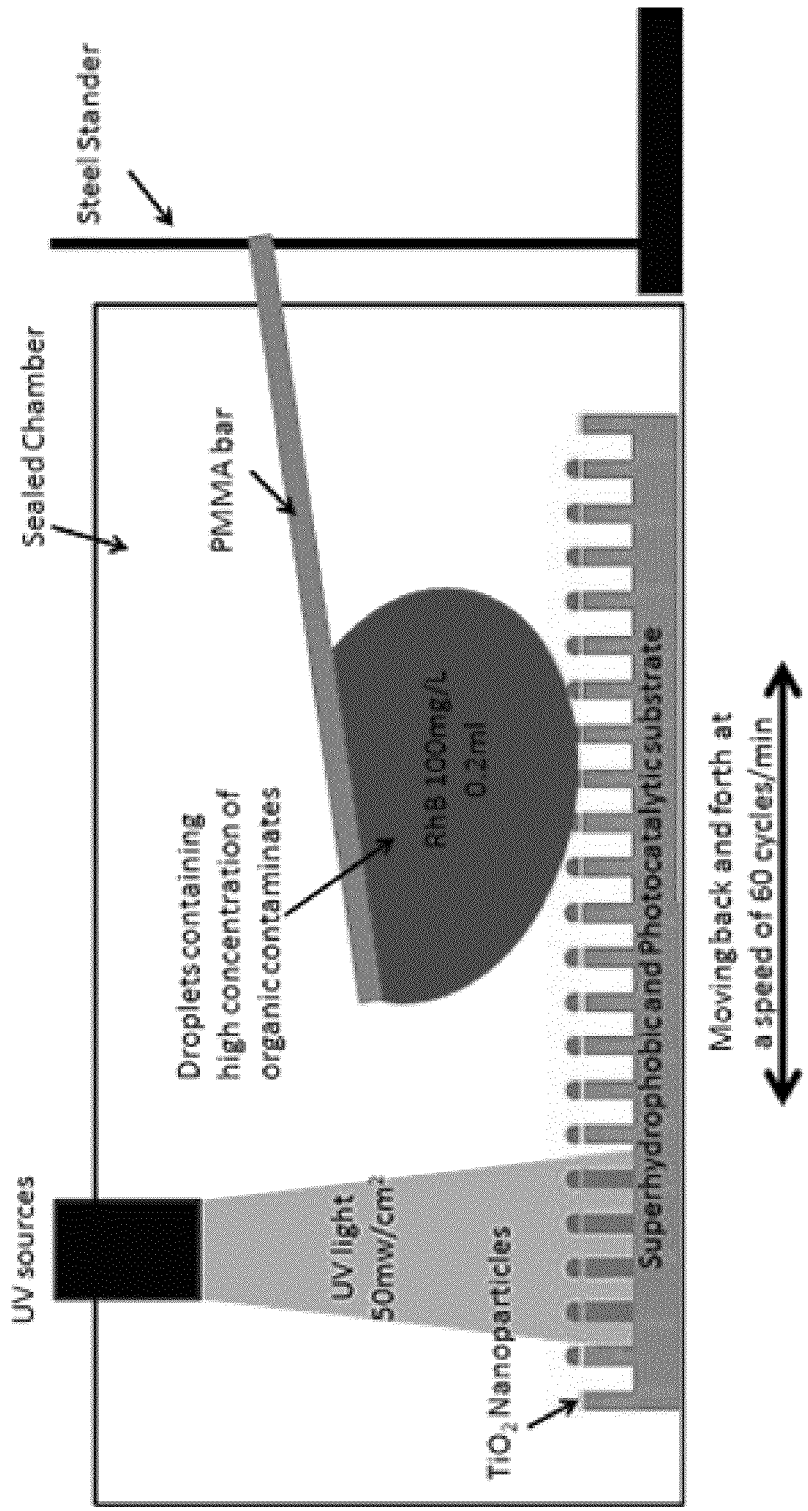
FIG. 32 is a depiction of an experimental setup for a water exposure experiment.

The photocatalytic activity of the surface was tested using a system as shown in FIG. 32. Water droplets (200 microliters) containing concentrated organic dye Rhodamine B (RhB, 100 mg per L) were used as a test contamination source. The droplet was kept in motion (60 Hz) under the UV light source to simulate a continuous stream of droplets (a UV transparent, hydrophilic PMMA bar was attached to a reciprocating table to drive the droplet). A mercury lamp was used as UV light source (300-450 nm with a peak at 365 nm), and the power density was set at 50 mW per square cm. The sample was fixed onto a chamber saturated with water vapor and sealed to minimize evaporation. Water droplets were collected and analyzed by UV-V is spectroscopy. The concentration of RhB dramatically decreased with the illuminating time; more than 90% of RhB was photodecomposed after illuminating for 180 min (10800 cycles of back and forth). These results demonstrate a relatively higher photocatalytic activity as compared to droplets held in the same position. These tests also demonstrate a good stability of the manufactured hybrid materials.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. An article comprising: a hydrophobic polymer surface with a water contact angle of at least about 150°; and a plurality of metal oxide nanoparticles disposed on the hydrophobic surface, at least some of the metal oxide nanoparticles being partially embedded in the hydrophobic polymer surface and partially exposed on the hydrophobic polymer surface, wherein the hydrophobic polymer surface is comprised of multi-level hierarchical structures formed from agglomerates of the metal oxide nanoparticles, at least some of the metal oxide nanoparticles partially being embedded into polymer filaments that emanate from the hydrophobic polymer surface, where the multi-level hierarchical structures range in size from 20 nanometers to 100 microns.

2. The article in claim 1 wherein the polymer filaments have a length between 1 to 100 microns.

3. The article of claim 1, wherein the hydrophobic polymer surface comprises a plurality of protrusions on the hydrophobic polymer surface, each protrusion comprising a top surface.

4. The article of claim 3, wherein the plurality of protrusions comprises two neighboring protrusions separated by a groove and at least some of the metal oxide nanoparticles are disposed on the groove.

5. The article of claim 4, wherein the top surface of the plurality of protrusions is substantially free of the metal oxide nanoparticles.

6. The article of claim 3, wherein the top surface of each protrusion comprises the metal oxide nanoparticles.

7. The article of claim 3, wherein the metal oxide nanoparticles comprise silica nanoparticles.

8. The article of claim 3, wherein the metal oxide nanoparticles comprise photocatalytic nanoparticles and are disposed on the top surface of the protrusions.

9. The article of claim 8, wherein the metal oxide nanoparticles are selected from the group consisting of titanium oxide nanoparticles, zinc oxide nanoparticles and vanadium oxide nanoparticles.

10. The article as recited in claim 1, wherein the multi-level hierarchical structures formed by the metal oxide nanoparticles comprise first structures with sizes between 20 nm to 100 nm, second structures with sizes between 100 nm and 300 nm, and third structures with sizes between 300 nm to 3 microns.

11. The article as recited in claim 1, wherein the metal oxide nanoparticles are present as a powder.

12. An article comprising: a hydrophobic polymer surface with a water contact angle of at least about 150°; and a plurality of nanoparticles disposed on the hydrophobic polymer surface, at least some of the nanoparticles being partially embedded in the hydrophobic polymer surface and partially exposed on the hydrophobic polymer surface, wherein the hydrophobic polymer surface is comprised of multi-level hierarchical structures formed from agglomerates of the nanoparticles, at least some of the nanoparticles partially being embedded into polymer filaments that emanate from the hydrophobic polymer surface, where the multi-level hierarchical structures range in height from 20 nanometers to 100 microns, the multi-level hierarchical structures comprising first structures with heights between 20 nm to 100 nm, second structures with heights between 100 nm and 300 nm, and third structures with heights between 300 nm to 3 microns.

13. An article comprising: a hydrophobic polymer surface with a plurality of protrusions, each protrusion comprising a top surface and a side wall; a plurality of metal oxide nanoparticles disposed on the hydrophobic polymer surface, at least some of the metal oxide nanoparticles being partially embedded in the hydrophobic polymer surface and partially exposed on the hydrophobic polymer surface, wherein the hydrophobic polymer surface is comprised of multi-level hierarchical structures formed from agglomerates of the metal oxide nanoparticles, at least some of the metal oxide nanoparticles partially being embedded into polymer filaments that emanate from the hydrophobic polymer surface, where the multi-level hierarchical structures range in size from 20 nanometers to 100 microns; and wherein the plurality of protrusions comprises two neighboring protrusions separated by a groove, the two neighboring protrusions being separated by a distance of at least about 5 micrometers and less than about 500 micrometers.

14. The article as recited in claim 13, wherein the two neighboring protrusions extend above the groove by a height of at least about 25 micrometers and less than about 1000 micrometers.

15. The article as recited in claim 13, wherein the two neighboring protrusions each have a width of at least about 2 micrometers and less than about 500 micrometers.

16. The article as recited in claim 13, wherein the metal oxide nanoparticles are disposed on the top surface but the groove is substantially free of the nanoparticles.

17. The article as recited in claim 13, wherein the metal oxide nanoparticles are disposed on both the top surface and the groove.

18. The article as recited in claim 13, wherein the metal oxide nanoparticles are first nanoparticles that are disposed on the groove, the article further comprising second nanoparticles that are disposed on the top surface, the first nanoparticles and the second nanoparticles having different compositions.

19. The article as recited in claim 18, wherein the two neighboring protrusions each have a width of at least about 2 micrometers and less than about 500 micrometers.

20. The article as recited in claim 13, wherein the plurality of protrusions comprises two neighboring protrusions separated by a groove and at least some of the nanoparticles are disposed on the groove and the top surface of the plurality of protrusions is substantially free of the metal oxide nanoparticles.

\* \* \* \* \*